US009495826B2

(12) United States Patent
Nicely et al.

(10) Patent No.: US 9,495,826 B2
(45) Date of Patent: Nov. 15, 2016

(54) GAMING SYSTEM, GAMING DEVICE, AND METHOD FOR PROVIDING A GAME IN WHICH PLAYERS POSITION SELECTORS WITHIN A FIELD OF SELECTIONS BASED ON VALUES MASKED BY THE SELECTIONS

(75) Inventors: Mark C. Nicely, Daly City, CA (US); Scott A. Caputo, Santa Clara, CA (US)

(73) Assignee: IGT, Las Vegas, NV (US)

( * ) Notice: Subject to any disclaimer, the term of this patent is extended or adjusted under 35 U.S.C. 154(b) by 1538 days.

(21) Appl. No.: 12/616,511

(22) Filed: Nov. 11, 2009

(65) Prior Publication Data

US 2011/0111827 A1 May 12, 2011

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ....... *G07F 17/3213* (2013.01); *G07F 17/3244* (2013.01); *G07F 17/3267* (2013.01)

(58) Field of Classification Search
CPC ............... G07F 17/32; G07F 17/3244; G07F 17/3267; G07F 17/3213
USPC ................................................ 463/9, 16, 20
See application file for complete search history.

(56) References Cited

U.S. PATENT DOCUMENTS 3,167,313 A 1/1965 Davenport et al.
4,003,578 A 1/1977 Jones
4,082,285 A * 4/1978 Bathurst ................ A63F 3/022 340/323 R
4,103,895 A 8/1978 Pressman et al.
4,182,515 A 1/1980 Nemeth
4,251,078 A 2/1981 Meirovitz (Continued)

FOREIGN PATENT DOCUMENTS

EP 0945837 9/1999
EP 1199689 4/2002

(Continued)

OTHER PUBLICATIONS

Minesweeperlive, http://minesweeperlive.com/howtoplay.php, Dec. 2, 2006.*

(Continued)

*Primary Examiner* — Omkar Deodhar
*Assistant Examiner* — Wei Lee
(74) *Attorney, Agent, or Firm* — Neal, Gerber & Eisenberg LLP

(57) ABSTRACT

A gaming system displays a plurality of spaced-apart selections each associated with a masked award. One or more selectors are each associated with one or more players, and are visible to each player. The selectors are moveable amongst the spaced-apart selections based on a plurality of player inputs. For a play of the game, the players provide inputs to move the selectors amongst the spaced-apart selections. During such movement, the gaming system temporarily reveals the award associated with any spaced-apart selection in the vicinity of any selector to at least one player, such as the player whose selector is near the selection. After the play of the game has ended (e.g., based on an amount of elapsed time), the gaming system provides awards to the players based on the ending positions of the one or more selectors with respect to the plurality of spaced-apart selections.

21 Claims, 14 Drawing Sheets

(56) References Cited

U.S. PATENT DOCUMENTS

| | | | |
|---|---|---|---|
| 4,277,067 A | 7/1981 | Gettleman | |
| 4,323,242 A | 4/1982 | Rosenfeld | |
| 4,511,143 A | 4/1985 | Sankrithi | |
| 4,548,410 A | 10/1985 | Morrone | |
| 4,820,908 A | 4/1989 | Wei | |
| 4,850,592 A | 7/1989 | Winter | |
| 5,080,368 A | 1/1992 | Weisser | |
| 5,083,800 A | 1/1992 | Lockton | |
| 5,178,395 A | 1/1993 | Lovell | |
| 5,178,545 A | 1/1993 | Thompson | |
| 5,333,868 A | 8/1994 | Goldfarb | |
| 5,342,049 A | 8/1994 | Wichinsky et al. | |
| 5,355,442 A | 10/1994 | Paglieroni et al. | |
| 5,566,942 A | 10/1996 | Elum | |
| 5,611,730 A | 3/1997 | Weiss | |
| 5,664,998 A * | 9/1997 | Seelig et al. | 463/20 |
| 5,769,716 A | 6/1998 | Saffari et al. | |
| 5,772,509 A | 6/1998 | Weiss | |
| 5,779,545 A | 7/1998 | Berg et al. | |
| 5,813,672 A | 9/1998 | Loud, Jr. | |
| 5,855,514 A | 1/1999 | Kamille | |
| 5,941,467 A | 8/1999 | McArdle et al. | |
| 5,947,820 A | 9/1999 | Morro et al. | |
| 5,961,384 A | 10/1999 | Robinson | |
| 5,980,384 A | 11/1999 | Barrie | |
| 6,015,346 A | 1/2000 | Bennett | |
| 6,069,971 A | 5/2000 | Kanno et al. | |
| 6,089,976 A | 7/2000 | Schneider et al. | |
| 6,102,798 A | 8/2000 | Bennett | |
| 6,126,542 A | 10/2000 | Fier | |
| 6,134,556 A | 10/2000 | Shin | |
| 6,159,095 A | 12/2000 | Frohm et al. | |
| 6,165,070 A | 12/2000 | Nolte et al. | |
| 6,254,481 B1 | 7/2001 | Jaffe | |
| 6,257,981 B1 | 7/2001 | Acres et al. | |
| 6,261,177 B1 | 7/2001 | Bennett | |
| 6,273,420 B1 | 8/2001 | Brooks | |
| 6,309,299 B1 | 10/2001 | Weiss | |
| 6,309,300 B1 | 10/2001 | Glavich | |
| 6,315,660 B1 | 11/2001 | DeMar et al. | |
| 6,315,664 B1 | 11/2001 | Baerlocher et al. | |
| 6,319,124 B1 | 11/2001 | Baerlocher et al. | |
| 6,328,649 B1 | 12/2001 | Randall et al. | |
| 6,340,159 B1 | 1/2002 | Giangrante | |
| 6,346,043 B1 | 2/2002 | Colin et al. | |
| 6,347,996 B1 | 2/2002 | Gilmore et al. | |
| 6,364,767 B1 | 4/2002 | Brossard et al. | |
| 6,386,974 B1 | 5/2002 | Adams | |
| 6,398,644 B1 | 6/2002 | Perrie et al. | |
| 6,406,369 B1 | 6/2002 | Baerlocher et al. | |
| 6,419,226 B2 | 7/2002 | Krise et al. | |
| 6,425,824 B1 | 7/2002 | Baerlocher et al. | |
| 6,428,412 B1 | 8/2002 | Anderson et al. | |
| 6,439,995 B1 | 8/2002 | Hughs-Baird et al. | |
| 6,443,837 B1 | 9/2002 | Jaffe et al. | |
| 6,450,883 B1 | 9/2002 | O'Halloran | |
| 6,494,785 B1 | 12/2002 | Gerrard et al. | |
| 6,511,375 B1 | 1/2003 | Kaminkow | |
| 6,514,141 B1 | 2/2003 | Kaminkow et al. | |
| 6,558,254 B2 | 5/2003 | Baelocher et al. | |
| 6,561,899 B2 | 5/2003 | Vancura | |
| 6,572,469 B2 | 6/2003 | Klitsner et al. | |
| 6,572,472 B1 | 6/2003 | Glavich | |
| 6,572,473 B1 | 6/2003 | Baerlocher | |
| 6,579,178 B1 | 6/2003 | Walker et al. | |
| 6,582,307 B2 | 6/2003 | Webb | |
| 6,589,117 B1 | 7/2003 | Moritome et al. | |
| 6,595,854 B2 | 7/2003 | Hughs-Baird et al. | |
| 6,599,185 B1 | 7/2003 | Kaminkow et al. | |
| 6,602,136 B1 | 8/2003 | Baerlocher et al. | |
| 6,602,137 B2 | 8/2003 | Kaminkow et al. | |
| 6,607,438 B2 | 8/2003 | Baerlocher et al. | |
| 6,632,141 B2 | 10/2003 | Webb et al. | |
| 6,638,164 B2 | 10/2003 | Randall et al. | |
| 6,641,137 B2 | 11/2003 | Sines et al. | |
| 6,645,071 B2 | 11/2003 | Perrie et al. | |
| 6,645,073 B2 | 11/2003 | Lemay et al. | |
| 6,645,074 B2 | 11/2003 | Thomas et al. | |
| 6,656,040 B1 | 12/2003 | Brosnan et al. | |
| 6,666,766 B2 | 12/2003 | Baerlocher et al. | |
| 6,676,516 B2 | 1/2004 | Baerlocher et al. | |
| 6,692,356 B2 | 2/2004 | Baerlocher et al. | |
| 6,722,981 B2 | 4/2004 | Kaminkow et al. | |
| 6,722,982 B2 | 4/2004 | Kaminkow et al. | |
| 6,722,983 B2 | 4/2004 | Kaminkow et al. | |
| 6,733,386 B2 | 5/2004 | Cuddy et al. | |
| 6,743,096 B2 | 6/2004 | Allendorf et al. | |
| 6,749,504 B2 | 6/2004 | Hughs-Baird | |
| 6,752,312 B1 | 6/2004 | Chamberlain et al. | |
| 6,758,747 B2 | 7/2004 | Baerlocher | |
| 6,769,983 B2 | 8/2004 | Slomiany | |
| 6,780,107 B2 | 8/2004 | Baerlocher et al. | |
| 6,780,110 B2 | 8/2004 | Baerlocher et al. | |
| 6,780,111 B2 | 8/2004 | Cannon et al. | |
| 6,783,455 B2 | 8/2004 | Glavich | |
| 6,783,457 B2 | 8/2004 | Hughs-Baird et al. | |
| 6,786,820 B2 | 9/2004 | Gerrard et al. | |
| 6,808,454 B2 | 10/2004 | Gerrard et al. | |
| 6,814,664 B2 | 11/2004 | Baerlocher et al. | |
| 6,817,944 B2 | 11/2004 | Kaminkow et al. | |
| 6,837,793 B2 | 1/2005 | McClintic | |
| 6,840,856 B2 | 1/2005 | Stern | |
| 6,843,721 B2 | 1/2005 | Vancura | |
| 6,843,722 B2 | 1/2005 | Webb | |
| 6,852,027 B2 | 2/2005 | Kaminkow et al. | |
| 6,863,606 B1 | 3/2005 | Berg et al. | |
| 6,875,108 B1 | 4/2005 | Hughs-Baird | |
| 6,899,620 B2 | 5/2005 | Kaminkow et al. | |
| 6,902,478 B2 | 6/2005 | McClintic | |
| 6,908,383 B2 | 6/2005 | Baerlocher et al. | |
| 6,913,533 B2 | 7/2005 | Cuddy et al. | |
| 6,918,334 B2 | 7/2005 | Trotechaud | |
| 6,918,830 B2 | 7/2005 | Baerlocher | |
| 6,929,545 B2 | 8/2005 | Vancura | |
| 6,932,701 B2 | 8/2005 | Glavich et al. | |
| 6,958,013 B2 | 10/2005 | Miereau et al. | |
| 6,966,833 B2 | 11/2005 | Kaminkow et al. | |
| 6,971,953 B2 | 12/2005 | Gerrard et al. | |
| 6,971,954 B2 | 12/2005 | Randall et al. | |
| 6,984,174 B2 | 1/2006 | Cannon et al. | |
| 6,988,947 B2 | 1/2006 | Baerlocher et al. | |
| 6,988,948 B2 | 1/2006 | Perrie et al. | |
| 6,995,751 B2 | 2/2006 | Falvo | |
| 6,996,833 B1 | 2/2006 | Olson et al. | |
| 6,997,805 B2 * | 2/2006 | Vancura | G07F 17/32<br>273/148 R |
| 7,037,191 B2 | 5/2006 | Rodgers et al. | |
| 7,040,984 B2 | 5/2006 | Mead | |
| 7,052,392 B2 | 5/2006 | Tessmer et al. | |
| 7,056,214 B2 | 6/2006 | Miereau et al. | |
| 7,077,744 B2 | 7/2006 | Cannon | |
| 7,104,888 B2 | 9/2006 | Miereau et al. | |
| 7,112,137 B2 | 9/2006 | Baerlocher et al. | |
| 7,121,942 B2 | 10/2006 | Baerlocher | |
| 7,160,186 B2 | 1/2007 | Cuddy et al. | |
| 7,160,188 B2 | 1/2007 | Kaminkow et al. | |
| 7,168,704 B1 | 1/2007 | Lawless | |
| 7,169,044 B2 | 1/2007 | Baerlocher et al. | |
| 7,172,506 B2 | 2/2007 | Baerlocher et al. | |
| 7,175,523 B2 | 2/2007 | Gilmore et al. | |
| 7,179,166 B1 | 2/2007 | Abbott | |
| 7,182,689 B2 | 2/2007 | Hughs-Baird et al. | |
| 7,198,570 B2 | 4/2007 | Rodgers et al. | |
| 7,201,657 B2 | 4/2007 | Baerlocher et al. | |
| 7,235,011 B2 | 6/2007 | Randall et al. | |
| 7,247,096 B2 | 7/2007 | Vancura | |
| 7,264,545 B2 | 9/2007 | Maya et al. | |
| 7,273,415 B2 | 9/2007 | Cregan et al. | |
| 7,294,058 B1 | 11/2007 | Slomiany et al. | |
| 7,300,348 B2 | 11/2007 | Kaminkow et al. | |
| 7,303,469 B2 | 12/2007 | Kaminkow et al. | |
| 7,311,598 B2 | 12/2007 | Kaminkow et al. | |
| 7,311,604 B2 | 12/2007 | Kaminkow et al. | |
| 7,314,408 B2 | 1/2008 | Cannon | |

(56) References Cited

U.S. PATENT DOCUMENTS

| | | | | |
|---|---|---|---|---|
| 7,314,409 | B2 | 1/2008 | Maya et al. | |
| 7,316,609 | B2 | 1/2008 | Dunn et al. | |
| 7,318,773 | B2 | 1/2008 | Baerlocher | |
| 7,326,115 | B2 | 2/2008 | Baerlocher | |
| 7,329,184 | B2 | 2/2008 | Yoshioka | |
| 7,335,102 | B2 | 2/2008 | Baerlocher et al. | |
| 7,338,367 | B2 | 3/2008 | Kaminkow et al. | |
| 7,338,369 | B2 | 3/2008 | Mierau et al. | |
| 7,351,140 | B2 | 4/2008 | Wolf et al. | |
| 7,357,714 | B2 | 4/2008 | Tessmer et al. | |
| 7,361,087 | B2 | 4/2008 | Baerlocher et al. | |
| 7,371,174 | B2 | 5/2008 | Baerlocher | |
| 7,377,849 | B2 | 5/2008 | Baerlocher et al. | |
| 7,393,280 | B2 | 7/2008 | Cannon | |
| 7,413,510 | B2 | 8/2008 | Schlegel et al. | |
| 7,427,235 | B2 | 9/2008 | Anderson et al. | |
| 7,448,948 | B2 | 11/2008 | Hughs-Baird et al. | |
| 7,485,038 | B2 | 2/2009 | Rothkranz et al. | |
| 7,513,828 | B2 | 4/2009 | Nguyen et al. | |
| 7,544,129 | B2 | 6/2009 | Baerlocher | |
| 2001/0024970 | A1 | 9/2001 | McKee et al. | |
| 2002/0052232 | A1 | 5/2002 | Kaminkow | |
| 2002/0187827 | A1* | 12/2002 | Blankstein | 463/20 |
| 2003/0013514 | A1 | 1/2003 | Cregan et al. | |
| 2003/0036422 | A1 | 2/2003 | Baerlocher et al. | |
| 2003/0036424 | A1 | 2/2003 | Baerlocher | |
| 2003/0040358 | A1 | 2/2003 | Rothkranz et al. | |
| 2003/0064773 | A1 | 4/2003 | Baerlocher et al. | |
| 2003/0064792 | A1* | 4/2003 | Baerlocher | G07F 17/3244 463/25 |
| 2003/0078096 | A1 | 4/2003 | Kaminkow et al. | |
| 2003/0092480 | A1* | 5/2003 | White | G07F 17/3265 463/20 |
| 2003/0148812 | A1 | 8/2003 | Paulsen et al. | |
| 2003/0153378 | A1 | 8/2003 | Schlegel et al. | |
| 2003/0157982 | A1 | 8/2003 | Gerrard et al. | |
| 2003/0162578 | A1 | 8/2003 | Baerlocher et al. | |
| 2003/0162584 | A1* | 8/2003 | Hughs-Baird | G07F 17/32 463/20 |
| 2003/0186733 | A1 | 10/2003 | Wolf et al. | |
| 2004/0048644 | A1 | 3/2004 | Gerrard et al. | |
| 2004/0048649 | A1 | 3/2004 | Peterson et al. | |
| 2004/0053665 | A1 | 3/2004 | Baerlocher | |
| 2004/0082378 | A1 | 4/2004 | Peterson et al. | |
| 2004/0106444 | A1 | 6/2004 | Cuddy et al. | |
| 2004/0176156 | A1 | 9/2004 | Walker et al. | |
| 2004/0242315 | A1 | 12/2004 | Paulsen et al. | |
| 2004/0248639 | A1 | 12/2004 | Slomiany | |
| 2005/0020351 | A1 | 1/2005 | Baerlocher et al. | |
| 2005/0033461 | A1 | 2/2005 | Gerrard et al. | |
| 2005/0054404 | A1 | 3/2005 | Baerlocher | |
| 2005/0054405 | A1 | 3/2005 | Baerlocher et al. | |
| 2005/0054415 | A1 | 3/2005 | Kaminkow et al. | |
| 2005/0054416 | A1 | 3/2005 | Hostetler et al. | |
| 2005/0054435 | A1 | 3/2005 | Rodgers et al. | |
| 2005/0054436 | A1 | 3/2005 | Frizzell et al. | |
| 2005/0059456 | A1 | 3/2005 | Mead et al. | |
| 2005/0059460 | A1 | 3/2005 | Breen et al. | |
| 2005/0059461 | A1 | 3/2005 | Ching et al. | |
| 2005/0064928 | A1 | 3/2005 | Baerlocher et al. | |
| 2005/0096114 | A1 | 5/2005 | Cannon et al. | |
| 2005/0096115 | A1 | 5/2005 | Vancura | |
| 2005/0096123 | A1 | 5/2005 | Cregan et al. | |
| 2005/0101372 | A1 | 5/2005 | Mierau et al. | |
| 2005/0101378 | A1 | 5/2005 | Kaminkow et al. | |
| 2005/0181860 | A1 | 8/2005 | Nguyen et al. | |
| 2005/0197180 | A1 | 9/2005 | Kaminkow et al. | |
| 2005/0218591 | A1 | 10/2005 | Torigian et al. | |
| 2006/0025195 | A1 | 2/2006 | Pennington et al. | |
| 2006/0025196 | A1 | 2/2006 | Webb et al. | |
| 2006/0030401 | A1 | 2/2006 | Mead et al. | |
| 2006/0040723 | A1 | 2/2006 | Baerlocher et al. | |
| 2006/0040732 | A1 | 2/2006 | Baerlocher et al. | |
| 2006/0040733 | A1 | 2/2006 | Baerlocher et al. | |
| 2006/0040734 | A1 | 2/2006 | Baerlocher et al. | |
| 2006/0040736 | A1 | 2/2006 | Baerlocher et al. | |
| 2006/0046822 | A1 | 3/2006 | Kaminkow et al. | |
| 2006/0068882 | A1 | 3/2006 | Baerlocher et al. | |
| 2006/0068893 | A1 | 3/2006 | Jaffe et al. | |
| 2006/0073874 | A1 | 4/2006 | Cregan et al. | |
| 2006/0084500 | A1 | 4/2006 | Baerlocher et al. | |
| 2006/0121970 | A1 | 6/2006 | Khal | |
| 2006/0183528 | A1 | 8/2006 | Rodgers et al. | |
| 2006/0199628 | A1 | 9/2006 | Rodgers et al. | |
| 2006/0217189 | A1 | 9/2006 | Walker et al. | |
| 2006/0246977 | A1 | 11/2006 | Cannon | |
| 2006/0252518 | A1 | 11/2006 | Walker et al. | |
| 2007/0015566 | A1 | 1/2007 | Baerlocher et al. | |
| 2007/0032285 | A1 | 2/2007 | Wolf | |
| 2007/0054732 | A1 | 3/2007 | Baerlocher | |
| 2007/0054733 | A1 | 3/2007 | Baerlocher | |
| 2007/0060246 | A1 | 3/2007 | Baerlocher et al. | |
| 2007/0060271 | A1 | 3/2007 | Cregan et al. | |
| 2007/0060300 | A1 | 3/2007 | Baerlocher | |
| 2007/0077990 | A1 | 4/2007 | Cuddy et al. | |
| 2007/0082725 | A1* | 4/2007 | Low et al. | 463/16 |
| 2007/0087809 | A1 | 4/2007 | Baerlocher | |
| 2007/0105620 | A1 | 5/2007 | Cuddy et al. | |
| 2007/0111783 | A1 | 5/2007 | Cuddy et al. | |
| 2007/0117606 | A1 | 5/2007 | Baerlocher et al. | |
| 2007/0129131 | A1 | 6/2007 | Kaminkow et al. | |
| 2007/0149267 | A1 | 6/2007 | Ross et al. | |
| 2007/0149269 | A1 | 6/2007 | Benbrahim | |
| 2007/0155464 | A1 | 7/2007 | Baerlocher et al. | |
| 2007/0155485 | A1 | 7/2007 | Cuddy et al. | |
| 2007/0167211 | A1 | 7/2007 | Rodgers et al. | |
| 2007/0167217 | A1 | 7/2007 | Kaminkow et al. | |
| 2008/0020817 | A1 | 1/2008 | Kaminkow et al. | |
| 2008/0020822 | A1 | 1/2008 | Cuddy et al. | |
| 2008/0020823 | A1 | 1/2008 | Cuddy et al. | |
| 2008/0020824 | A1 | 1/2008 | Cuddy et al. | |
| 2008/0020825 | A1 | 1/2008 | Cuddy et al. | |
| 2008/0020829 | A1 | 1/2008 | Baerlocher | |
| 2008/0020842 | A1 | 1/2008 | Kaminkow et al. | |
| 2008/0020847 | A1 | 1/2008 | Kniesteadt et al. | |
| 2008/0026808 | A1 | 1/2008 | Yoshizawa | |
| 2008/0051168 | A1 | 2/2008 | Kaminkow et al. | |
| 2008/0051188 | A1 | 2/2008 | Inamura | |
| 2008/0058046 | A1 | 3/2008 | Schwartz et al. | |
| 2008/0070662 | A1 | 3/2008 | Verardi et al. | |
| 2008/0070676 | A1 | 3/2008 | Baerlocher et al. | |
| 2008/0070677 | A1 | 3/2008 | Baerlocher et al. | |
| 2008/0070678 | A1 | 3/2008 | Baerlocher et al. | |
| 2008/0070702 | A1 | 3/2008 | Kaminkow et al. | |
| 2008/0081690 | A1 | 4/2008 | Baerlocher et al. | |
| 2008/0081691 | A1 | 4/2008 | Baerlocher et al. | |
| 2008/0090651 | A1 | 4/2008 | Baerlocher | |
| 2008/0102916 | A1 | 5/2008 | Kovacs et al. | |
| 2008/0102920 | A1 | 5/2008 | Baerlocher | |
| 2008/0108401 | A1 | 5/2008 | Baerlocher et al. | |
| 2008/0108429 | A1 | 5/2008 | Davis et al. | |
| 2008/0113765 | A1 | 5/2008 | DeWaal | |
| 2008/0113768 | A1 | 5/2008 | Baerlocher | |
| 2008/0113771 | A1 | 5/2008 | Baerlocher et al. | |
| 2008/0139274 | A1 | 6/2008 | Baerlocher | |
| 2008/0139290 | A1 | 6/2008 | Kniesteadt et al. | |
| 2008/0146321 | A1 | 6/2008 | Parente | |
| 2008/0149292 | A1 | 6/2008 | Scherb | |
| 2008/0153564 | A1 | 6/2008 | Baerlocher et al. | |
| 2008/0176650 | A1 | 7/2008 | Wolf et al. | |
| 2009/0042644 | A1 | 2/2009 | Zielinski | |
| 2009/0104959 | A1 | 4/2009 | Caputo et al. | |
| 2010/0048282 | A1 | 2/2010 | Nicely et al. | |

FOREIGN PATENT DOCUMENTS

| | | |
|---|---|---|
| EP | 1298607 | 4/2003 |
| EP | 1531434 | 5/2005 |
| EP | 1764753 | 3/2007 |
| EP | 1779908 | 5/2007 |
| GB | 2097160 | 10/1982 |
| GB | 2113881 | 8/2003 |
| WO | WO97/32285 | 9/1997 |
| WO | WO00/12186 | 3/2000 |

(56) References Cited

FOREIGN PATENT DOCUMENTS

| | | |
|---|---|---|
| WO | WO01/74464 | 10/2001 |
| WO | WO03/026759 | 4/2003 |
| WO | WO03/049053 | 6/2003 |
| WO | WO2005/002697 | 1/2005 |
| WO | WO2005/015826 | 2/2005 |
| WO | WO2006/017067 | 2/2006 |
| WO | WO2006/028860 | 3/2006 |
| WO | WO2007/021724 | 2/2007 |
| WO | WO2007/052549 | 5/2007 |
| WO | WO2008/045398 | 4/2008 |
| WO | WO2008/045464 | 4/2008 |

OTHER PUBLICATIONS

Article entitled "Battle Plan" in Strictly Slots, published Sep. 2000.
Battleship instructions, Hasbro, published 2002.
Battleship All Aboard, website description, Mikohn, website printed 2001.
Article entitled "Cash Box" in Strictly Slots, published Jul. 2000.
Clue: The Great Museum Caper, Wikipedia description, http://en.wikipedia.org/wiki/Clue:_The_Great_Museum_Caper, websiteprinted on Jan. 29, 2008.
Command & Conquer, Wikipedia description, http://en,wikipedia.org/wiki/Command_and_conquer, website printed Aug. 18, 2008.
Article entitled "Cool Cat Cash" in Strictly Slots, published Jul. 2005.
Article entitled "Crazy Fruits" in Strictly Slots, published Apr. 2001.
Article entitled "Deviled Eggs" in Strictly Slots, published May 2005.
Dig Dug, Wikipedia description, http//en.wikipedia.org/wiki/Dig_Dug, website printed on Jan. 29, 2008.
Dots and Boxes—Game Description from Wikipedia, http://en.wikipedia.org/wiki/Dots_and_Boxes, available prior to Nov. 13, 2008.
Article entitled "Hollywood Squares-Premier Night" in Strictly Slots, published 2005.
Its My Party advertisement, IGT, published 2004.
Jeopardy Video Slots advertisement, IGT, published in 2000.
Loop game, Screen Shot and game description, http://www.shockwavegames.com, available prior to Jun. 2008.
Article entitled "Men in Black" in Strictly Slots, published Apr. 2004.
Microsoft Surface description, http://en.wikipedia.org/wiki/Microsoft_surface, available prior to Nov. 13, 2008.
Minesweeper (computer game), Wikipedia description, http://en.wikipedia.org/wiki/Minesweeper_(compter_game), website printed Jan. 29, 2008.
Pit Card Game from Parker Brothers, downloaded from http://en.wikipedia.org/wiki/Pit_(game), available prior to Nov. 2008. (See Attached).
Radar Mission, Wikipedia description, http://en.wikipedia.org/wiki/Radar_Mission, website printed Aug. 18, 2008.
Stratego, Wikipedia description, http://en.wikipedia.org/wiki/Stratego, website printed on Sep. 3, 2008.
Triple Double Dollars Video Slots advertisement, IGT, published 2004.

* cited by examiner

GAMING SYSTEM, GAMING DEVICE, AND METHOD FOR PROVIDING A GAME IN WHICH PLAYERS POSITION SELECTORS WITHIN A FIELD OF SELECTIONS BASED ON VALUES MASKED BY THE SELECTIONS

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Player selection bonus games are well-known in the gaming industry. In certain known player selection bonus games, a gaming device displays a plurality of positions to a player, some of which are associated with awards and at least one of which is associated with a terminator or terminating symbol. In these games, the gaming device enables the player to select positions until the player selects a position associated with the terminator or terminating symbol, at which time the gaming device provides the player with any earned awards, and the bonus game ends. In other player selection bonus games, the gaming device enables the player to select a certain number of positions for a play of the game, and provides any awards based on which of the positions were selected. In one known variation, the player may earn additional selection opportunities in the bonus game by picking one or more of the selections associated with an outcome which results in more picks. These selection bonus games typically do not require any player skill, nor do they enable players to utilize strategy, as the player randomly selects symbol positions for plays of the bonus game.

Other known player selection games are matching games. These matching games generally require a player to select displayed positions and display a symbol at each selected position. Such matching games typically continue to display symbols at previously-selected positions until the player selects two or more matching symbols, at which time the player may be provided with an award. Thus, certain known selection games which include matching games do not require an element of skill, as the previously selected symbols remain revealed even after selection.

Certain known games are multiplayer games that enable a plurality of players to simultaneously participate in a play of the game. The number of players playing such games can vary, and some multiplayer games enable a single player to play the game alone. However, many multiplayer games that enable only one player to play alone suffer from an inability to provide an exciting and entertaining game experience if only a single player is playing the game. Thus, certain known games discourage a first player from beginning to play the game, as that first player's gaming experience will be substantially different than if a plurality of players were simultaneously playing.

Certain known multiplayer bonus games are synchronous games, such that each of a plurality of players participating in a play of the game begin and end the play of the game simultaneously. That is, when players of these bonus games obtain access to the bonus game (such as by receiving a designated winning symbol combination in a play of a primary game), the gaming device can require the players to wait a designated time period to allow other players to potentially gain access to the bonus game. This waiting period can be frustrating to players who have to wait for a relatively long time to participate in the play of the bonus game.

Accordingly, a need exists for gaming systems, gaming devices and methods providing new and exciting player selection games to individual players and to multiple players simultaneously which enable players to use skill to determine awards for plays of the player selection games. A further need exists for gaming systems, gaming devices, and methods providing new and exciting games to increase player enjoyment regardless of a quantity of players playing the game.

SUMMARY

The present disclosure relates generally to gaming systems, gaming devices, and methods for providing a game which enables players to indicate desired positions for selectors to win awards masked by spaced-apart selections for a play of the game. More particularly, one embodiment of the gaming system disclosed herein displays a plurality of spaced-apart selections in a field of selections for a play of the game. In this embodiment, the gaming system enables each of a plurality of players to indicate a desired position for a selector associated with that player. The gaming system thereafter displays each selector as moving toward the appropriate indicated position at a designated rate of speed. During the play of the game, the gaming system also temporarily displays information about any of the spaced-apart selections which are in a designated spatial relationship with any selector to the player with whom that selector is associated, such as by displaying a value masked by a selection to a player whose selector has the designated spatial relationship with that selection. The gaming system enables the players to continue to indicate desired positions for each of the selectors during the play of the game and continues to temporarily display values masked by selections in the designated spatial relationship with the selectors. At the end of the play of the game (such as upon the expiration of a designated time period), the gaming system provides any awards based on the spatial relationships between the selectors and the spaced-apart selections.

In various embodiments, the disclosed gaming system enables players to play a game as ether a base/primary game or as a bonus/secondary game. For example, if the disclosed game is a base game, the gaming system enables players to wager on plays of the game. If the game is a bonus game, the gaming system enables players to play the game upon occurrences of appropriate triggering events.

In one embodiment, the gaming system displays or defines a field for a play of the game. The gaming system displays a plurality of spaced-apart selections within the field. In one embodiment, each of the plurality of spaced-apart selections is associated with an award. Each of the spaced-apart selections preferably masks or does not initially display the award with which it is associated. It should thus be appreciated that in certain embodiments, each of the plurality of spaced-apart selections represents a potential award temporarily displayable to a player during the play of the game, and thereafter obtainable or winnable by the player at the conclusion of the play of the game.

In one embodiment, the gaming system displays one or more positionable selectors to at least one player for the play of the game. For example, the gaming system displays a plurality of movable selectors such that at least one movable selector is associated with each of a plurality of players and such that each selector is simultaneously moveable based on a plurality of player inputs provided during the play of the game. In one embodiment, the gaming system displays to each player any selector associated with that player and any selector associated with any of the other players.

In one embodiment, during a play of the game, the gaming system enables players to each provide a plurality of inputs to win one or more awards masked by one or more of the spaced-apart selections. In one such embodiment, the gaming system enables each player to provide a plurality of inputs indicative of a plurality of desired positions for any selectors associated with that player. In one embodiment, the gaming system enables a player to provide an input indicative of a desired position of at least one selector when the selector is in a current or first position. In this embodiment, the input is indicative of a desired or second position which is different from the current or first position. Upon providing such an input, the gaming system displays the selector as beginning to move toward the desired or second position at an appropriate rate of speed. For example, the gaming system displays the selector as moving toward the desired or second position at a pace or rate of speed which would only enable the selector to fully traverse the field once during the play of the game. In one embodiment, the gaming system enables players to provide inputs based on factors of movement of one or more selectors. For example, the gaming system enables the players to make strategic determinations based, at least in part, on the rates of speed with which the displayed selectors are moving during the play of the game.

In one embodiment, as the gaming system displays a selector as moving from a current position toward a desired position, the gaming system continuously determines whether the moving selector is in a designated spatial relationship with any of the plurality of spaced-apart selections. In this embodiment, if the gaming system determines that a selector is in the designated spatial relationship with any of the selections, the gaming system causes a temporary display of one or more award values associated with such spatially related selection(s). In one such embodiment, wherein the designated spatial relationship is based on proximity, the gaming system causes a temporary display of any award value associated with any of the spaced-apart selections which is displayed as having a designated proximity with a moving selector. That is, the designated spatial relationship exists if a moving selector is displayed sufficiently near to any of the spaced-apart selections. In one embodiment, the gaming system temporarily displays the award masked by a selection for as long as the moving selector remains in the designated spatial relationship with that selection. In another embodiment, the gaming system temporarily displays the award masked by such a selection for a designated period of time, such as for five seconds. In one embodiment, the gaming system only temporarily displays the award masked by the selection having the designated spatial relationship with a selector to the player with whom that selector is associated. That is, a player can see the awards masked by selections only based on the position of his or her selector(s). In this embodiment, the gaming system enables a player to make decisions based on the displayed positions of each of the selectors, and on the values masked by selections in the designated spatial relationship with that player's selector(s).

A play of the game disclosed herein can span a designated period of time determined by the gaming system. In one such embodiment, the gaming system determines the designated period of time based on an actual passage of time for the play of the game. In another embodiment, the gaming system determines the designated period of time based on a number of inputs provided by players of the gaming system, such as by providing each player with a designated number of inputs for a single play of the game.

At the end of a play of the game (e.g., at the expiration of the designated period of time), the gaming system provides awards to any players based on the displayed positions of the selectors at the end of the play of the game. In one such embodiment, the gaming system provides an award to each player whose selector(s) are in the designated spatial relationship with any of the spaced-apart selections, such as by providing an award to any player whose selector(s) are displayed in sufficient proximity to any of the spaced-apart selections, at the end of the play of the game. In another such embodiment, the gaming system provides an award to any player whose selector(s) are displayed as touching or overlapping any of the spaced-apart selections at the end of the play of the game. In one embodiment, the gaming system determines the value of any award(s) to be provided based on the award values masked by any selection having the designated spatial relationship with any of the selector(s). Thus, it should be appreciated that, the gaming system increases player excitement and enjoyment by encouraging a player to indicate desired positions of the selector(s) such that the player's selector(s) end the play of the game in the designated spatial relationship with a selection masking a relatively large award.

In one embodiment, the gaming system defines one or more constraints applicable to the movement of the selectors within the field of spaced-apart selections. In one such embodiment, the gaming system defines a speed constraint such as a pace or rate applicable to the movement of the selectors. In one embodiment, the speed constraint results in each selector being displayed as moving at a relatively slow speed with respect to the designated period of time. Thus, the speed with which the selectors move requires players to carefully determine any inputs indicative of desired positions of the selectors. For example, the gaming system causes the selector to move at an appropriate speed such that the selector can travel from one side of the field to the other and back again, but not more, during the designated period of time. In various embodiments, the gaming system alters the speed with which one or more of the selectors moves within the field during a play of the game based, for example, on a wager amount provided by a player for the play of the game. In various embodiments, the gaming system applies constraints relating to a total distance a selector can move during a play of the game, a number of inputs providable by a player during a play of the game, or any other suitable constraint on the movement of the selectors.

It should be appreciated that constraints applicable to the movement of the selectors, the length of the designated period of time spanned by a play of the game, and the information displayed to the players about the positions of selectors and selections within the field, enable players of the disclosed gaming system to develop a strategy in inputting desired positions of the selectors. That is, in various embodiments, the gaming system disclosed herein defines a goal (e.g., for a player's selector to be in the designated spatial relationship with a selection masking the highest-value award possible at the end of the play of the game) and enables the player to extract information from the gaming system during the play of the game to inform that goal (e.g., the gaming system displays the positions of the selectors and displays an indication of the award values masked by the spaced-apart selections). In one embodiment, the amount of information extractable during the play of the game is limited based on one or more constraints on the movement of the selector(s) and/or based on the designated spatial relationship for the play of the game (e.g., the speed of the selectors and/or the length of the game limit the number of selections whose masked values can be temporarily revealed for a play of the game). Based on the information extracted from the gaming system during a play of the game, the gaming system enables players to develop a strategy to ensure that one or more selectors is in a desired position with respect to the spaced-apart selections at the end of the play of the game, such that an award masked by a particular one of the selections can be provided. Further, the gaming system enables players to weigh a desired amount of risk during the play of the game, such as by enabling the players to choose desired positions which are relatively far from an initial position of the selector, in an effort to discover selections associated with relatively high-valued awards.

In one embodiment, the disclosed gaming system provides a single-player game. In this embodiment, the field of spaced-apart selections is displayed to a single player, and the gaming system enables the player to indicate a plurality of desired positions for one or more selectors during a play of the game. During the play of the game, the gaming system displays information about selections, such as award values masked by the selections, based on the position of the selector(s). The gaming system then provides an award to the single player based on the position of any selector(s) with respect to the selections. In this embodiment, the gaming system increases player excitement and enjoyment by requiring the player to provide inputs indicative of desired positions of the selector(s) during a designated time period based on previously revealed values and also based on the constraints associated with the game.

In another embodiment, the disclosed gaming system enables a plurality of players to each indicate desired positions of one or more selectors within a communal field of spaced-apart selections, each selection representing an opportunity for any of the plurality of players to receive an award associated with that selection for a play of the game. The gaming system causes the plurality of selectors to move within the field according to the inputs by the plurality of players. In this embodiment, the gaming system enables players to make decisions about a desired final position of one or more selectors using information revealed to that player based on the positions of that player's selector(s), and also based, in part, on information revealed to that player based on other players' selector(s). For example, if a player notices that another player's selector is lingering around or circling a particular selection, the gaming system enables the player to deduce that the award masked by the lingered-around or circled selection is a relatively high-value award, and enables the player to thereafter provide inputs to position his or her selector(s) in the designated spatial relationship with the lingered-around or circled selection. Finally, the gaming system enables the player to make meaningful strategic decisions with respect to what the player believes other players will do for a play of the game. For example, if the player discovers a relatively high-valued award, the player may be inclined to continue exploring to try to find even higher-valued awards. However, in this example, the player can weigh his or her perceived likelihood of finding a higher-valued award against his or her perceived likelihood that of another player will find and redeem the original, relatively high-valued award.

The gaming system disclosed herein can operate in synchronous or asynchronous embodiments. In a synchronous embodiment, the gaming system enables each of a plurality of players participating in a play of the game to begin and end the play of the game together. In one such synchronous embodiment, one or more players waits to begin or end a play of the game (i.e., until another player is ready to begin or end the play of the game). In an asynchronous embodiment, at least one player begins a play of the game before another player, or at least one player ends the play of the game before another player. In one such asynchronous embodiment, players do not wait to begin or end plays of the game (i.e., a player begins a play of the game as soon as an appropriate wager is placed or triggering event occurs, and ends the play of the game when the player has redeemed or collected an award).

The gaming system disclosed herein advantageously enables a player to implement his or her gaming strategy by making non-trivial decisions. It is another advantage of the disclosed gaming system to enable the player to attempt to maximize an amount earned for a play of the game by making strategic decisions, by thinking and reacting quickly to the information presented to the player, by having physical skill regarding his or her hand-eye coordination, and by observing and making inferences regarding the play of the game by other players. Moreover, the gaming system provides an exciting and entertaining gaming experience in that a plurality of players are each trying to maximize awards obtained during a predetermined period of time.

It should thus be appreciated that the disclosed gaming system displays a plurality of selections in a predefined field and at least one selector configured to be positioned amongst the selections during a play of a game, wherein the position of any selector at the end of the game determines any awards provided to one or more players, and wherein information gained during the play of the game enables the players to move selectors according to player-developed strategies.

It should also be appreciated that in one embodiment, the gaming system disclosed herein enables players to provide inputs indicative of desired positions of selectors according to the players' determinations of the "best" or "most desired" positions of the selectors while considering one or more constraints on the movement of the selectors in the field.

It should be further appreciated that in various embodiments the gaming system disclosed herein enables players to begin play of a bonus game immediately following the player obtaining access to the bonus game. That is, various embodiments of the disclosed gaming system enable a first player to begin participating in a bonus game, and thereafter enables a second player to begin participating in the bonus game, without requiring either player to wait for other players to become eligible for the bonus game. In various embodiments, the gaming system also enables a player to elect to wait to begin play of the bonus game, if such waiting is the player's preference or is part of the player's strategy.

Additional features and advantages are described in, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
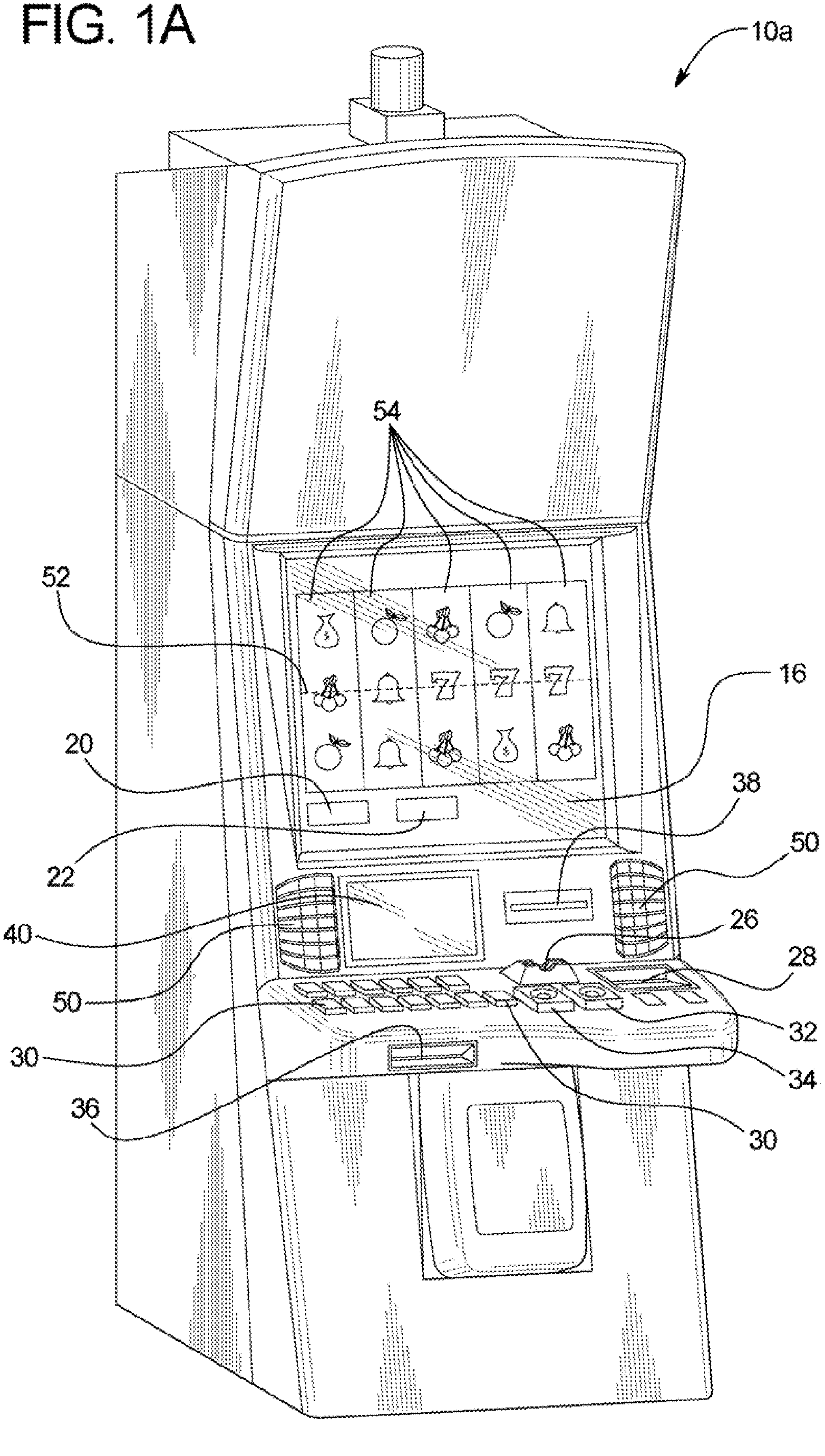
FIGS. 1A and 1B are perspective views of example alternative embodiments of the gaming device of the present disclosure.
Figure 1B:
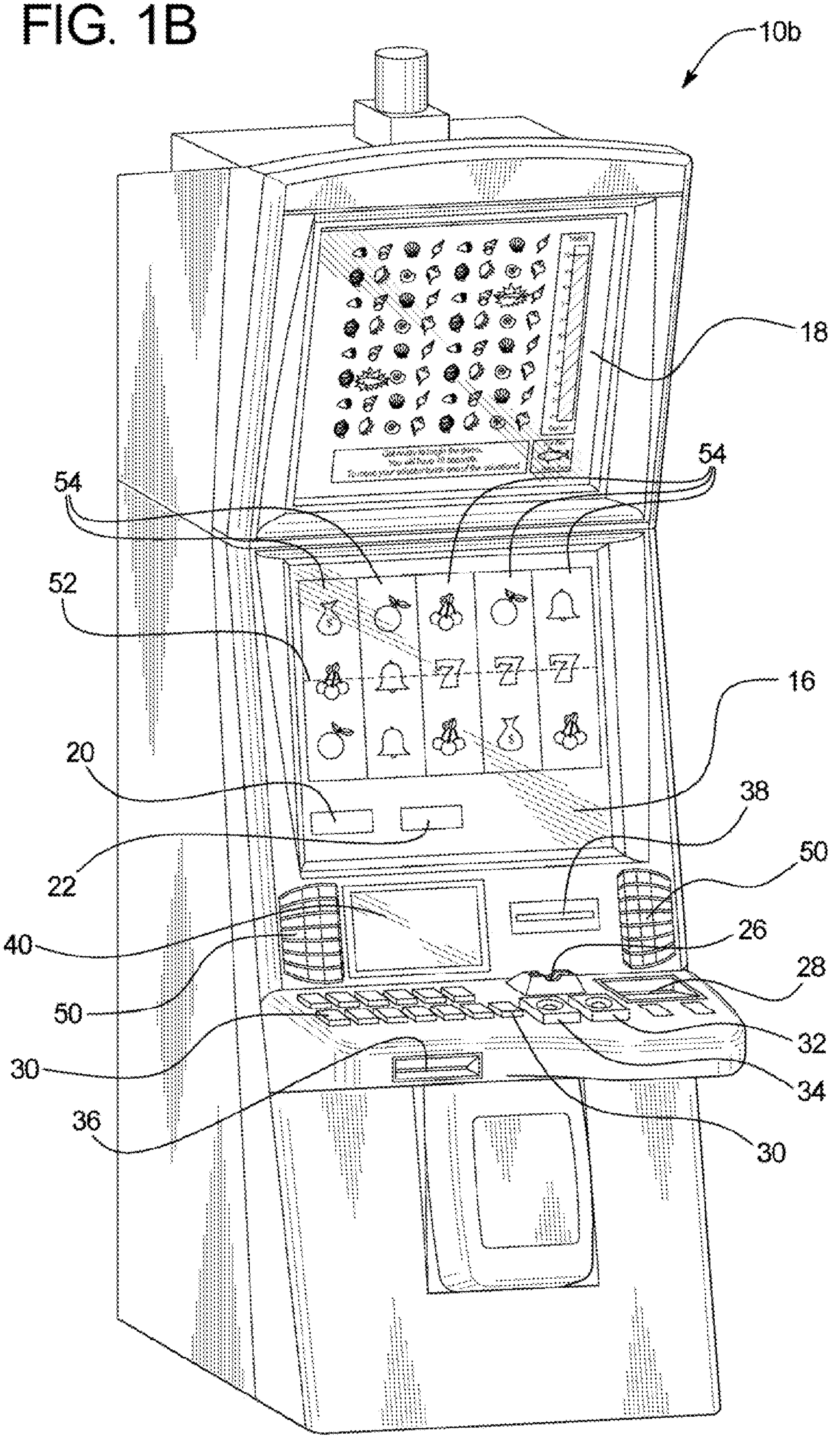

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
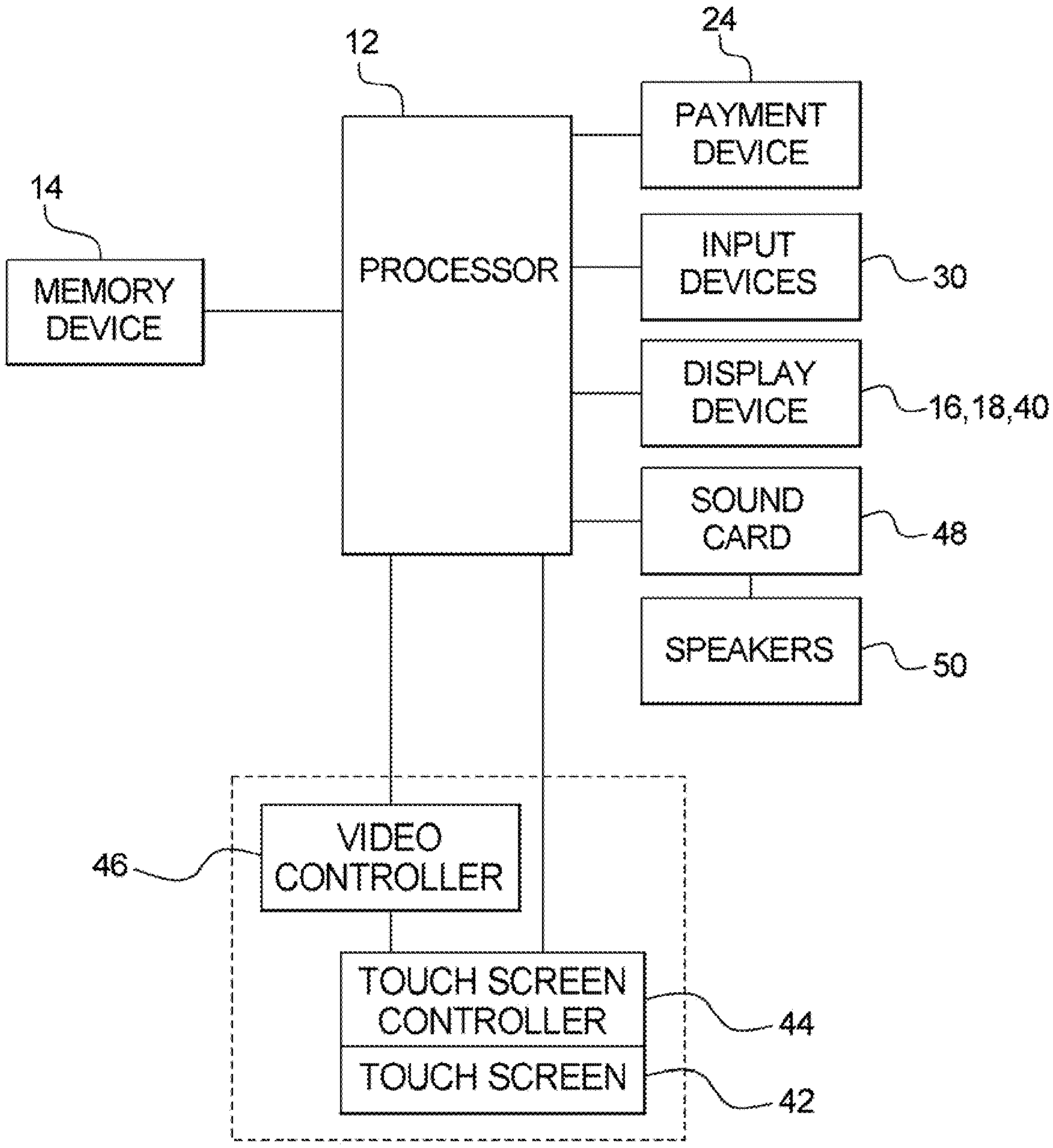
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a players wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a players wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
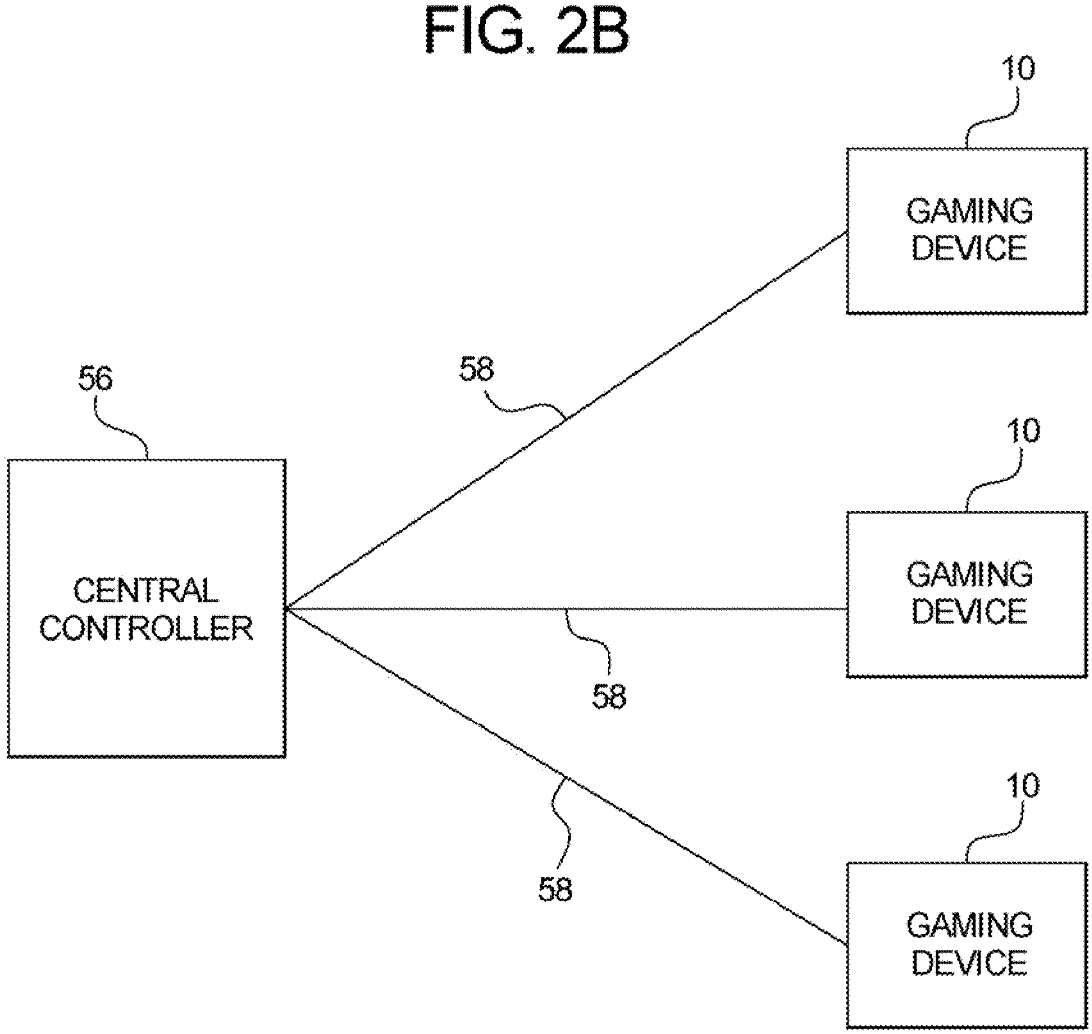
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an Internet connection and computer or other Internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Game Providing an Award Based on a Spatial Relationship Between Selectors and Selections In one embodiment, the gaming system disclosed herein enables at least one player to play a game during which each player provides a plurality of inputs to cause one or more selectors to be displayed as moving within a field of spaced-apart selections. In one embodiment, each selector is associated with a player, and each of the plurality of spaced-apart selections masks an award or value potentially winnable by the player for the play of the game.

In one embodiment, during the play of the game, the gaming system displays each selector as moving amongst the plurality of selections based on inputs provided by the at least one player. In one embodiment, the gaming system displays each selector as moving within the field at a designated rate or speed, such that an appropriate, discernable amount of time passes between when a player provides an input indicative of a desired position and when the selector reaches the desired position. In one embodiment, the speed or rate of movement within the field is the same for each selector. In one embodiment, one or more selectors moves at a different rate than the remaining selectors. In one embodiment, the speed of at least one of the selectors changes during a play of the game, such as based on one or more wager amounts provided by a player or based on one or more value revealed during the play of the game.

In one embodiment, the gaming system defines and detects a designated spatial relationship between a selector and a selection, such that if the designated spatial relationship exists between a selector and a selection, the gaming system temporarily displays the value masked by that selection. In one embodiment, the designated spatial relationship exists if a selector and a selection are displayed within a designated distance of each other. In another embodiment, the designated spatial relationship exists if a selector is displayed as touching or overlapping a selection after the selector has stopped moving.

In one embodiment, the gaming system temporarily displays any value masked by a selection having the designated spatial relationship with a selector only to the player with whom the selector is associated. In one such embodiment, the gaming system temporarily displays such a value by displaying the value for a designated period of time. In another embodiment, the gaming system temporarily displays the value by displaying the value so long as the selector maintains the designated spatial relationship with the selection. In one embodiment, the gaming system temporarily displays the value masked by a selection to at least one second player in addition to a first player whose selector caused the value to display.

In one embodiment, the plurality of selections mask one or more values such that when the gaming system determines that a selector has the designated spatial relationship with one of the selections, the gaming system displays an indication of the value associated with the spatially related selection. In one embodiment, the gaming system displays the position of each selector to each player, regardless of the player with whom the selector is associated. For example, if a first selector is associated with a first player and not a second player, the gaming system temporarily displays the value masked by any selection in the designated spatial relationship with the first selector only to the first player and not to the second player, but displays the position of the selector within the field to both the first player and the second player. In one embodiment, the gaming system temporarily displays a value masked by or associated with a selection for a relatively short period of time. In various embodiments, the period of time for which the masked or associated value is displayed is based on a passage of an amount of time, or is based on whether the selection masking or associated with that value is still in the designated spatial relationship with any selector.

In one embodiment, a play of the game spans a designated period of time. In another embodiment, a play of the game spans a plurality of inputs provided by the player(s). In one embodiment, at the end of the play of the game, the gaming system determines whether any of the selectors are in the designated spatial relationship with any of the selections. If so, the gaming system provides awards based on the spatially related selections, such as by providing an award having a value determined from the values masked by the spatially related selections.

In one embodiment, the gaming system disclosed herein enables a plurality of players to simultaneously participate in the disclosed game, and causes the position of each of a plurality of selectors to be visible to each of the plurality of players. In this embodiment, the visibility of other players' selectors enables a player to develop a strategy (i.e., a perceived "best" set of inputs) to attempt to maximize the player's possible award value. For example, if a player perceives that another player's selector is hovering around or circling a particular one of the selections, the player may elect to provide inputs to cause his or her own selector to move into the designated spatial relationship with the hovered-around or circled selection. In this embodiment, the player perceives the fact that the particular hovered-around or circled selector is being hovered around or circled as meaning that the selection is masking a relatively high value. Thus, the player can provide inputs in an effort to have his or her selector in the designated spatial relationship with the circled selection at the end of the play of the game.

Figure 3:
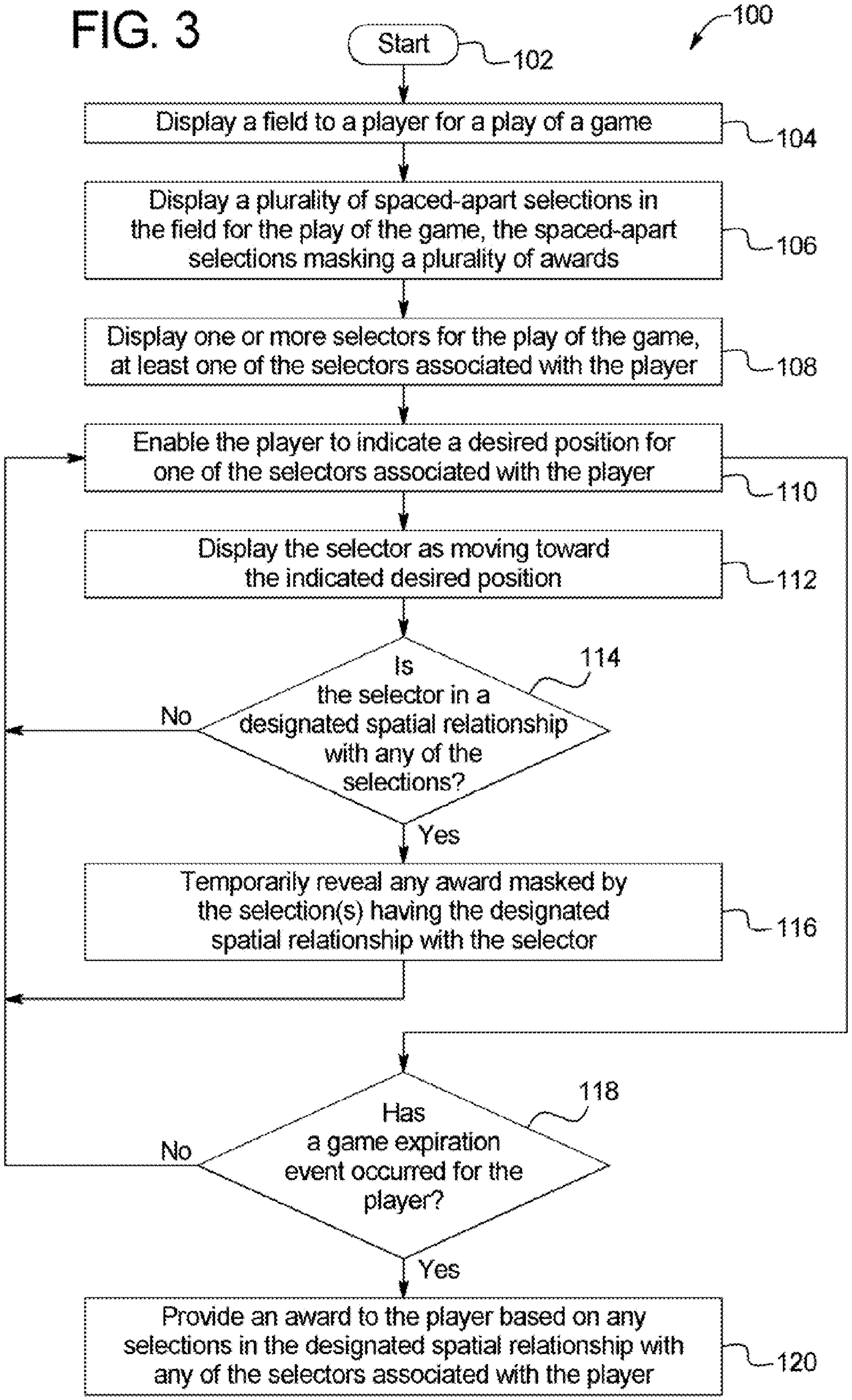
FIG. 3 is a flow chart of an example process for operating the gaming system disclosed herein.

FIG. 3 illustrates a flow chart of an example process 100 for operating one embodiment of the gaming system disclosed herein. Although the example process 100 for operating the gaming system is described with reference to the flow chart illustrated in FIG. 3, many other methods of operating a gaming system are contemplated. For example, the order of certain of the steps of process 100 may be changed, and certain of the steps of process 100 are optional.

In various embodiments, upon the beginning of a play of the game disclosed herein, as illustrated by oval 102, the disclosed gaming system displays a field to a player, as indicated by block 104. The gaming system displays the field using one or more display devices 16 of one or more gaming devices in the gaming system. Alternatively, the gaming system displays the field using one or more communal display devices connected to each of a plurality of gaming devices (and visible to a plurality of players at the plurality of gaming devices) of the gaming system.

The gaming system displays a plurality of spaced-apart selections in the field for the play of the game, as indicated by block 106. The plurality of spaced-apart selections mask a plurality of awards, as indicated by block 106. In other words, the gaming system displays a plurality of selections without displaying any awards associated with those selections. For example, each of the displayed spaced-apart selections masks one of a plurality of awards. In various embodiments, the awards include one or more selected from the group consisting of credits, additional plays of the game, multipliers, physical prizes, or other suitable awards. The gaming system also displays one or more selectors for the play of the game, as indicated by block 108. As further indicated by block 108, at least one of the selectors is associated with the player.

After displaying the field, the selections, and any selectors, the gaming system enables the player to participate in the play of the disclosed game by indicating a desired position for the selector(s) associated with the player, as indicated by block 110. In various embodiments, the gaming system enables the player to indicate this desired position by touching a portion of an appropriate touch screen controller or by manipulating another appropriate type of input device. In one embodiment, the gaming system enables the player to indicate a desired position by indicating a desired end location of the selector. In another embodiment, the gaming system enables the player to indicate a desired position by indicating a direction for the selector.

After the player provides an input indicative of a desired position of one of the selectors, as indicated by block 110, the gaming system displays the indicated selector as moving toward the indicated desired position, as indicated by block 112. As the gaming system displays the selector as moving toward the indicated desired position, the gaming system determines whether the moving selector is in a designated spatial relationship with any of the displayed spaced-apart selections, as indicated by decision diamond 114. If, as the moving selector moves within the field of selections, the gaming system determines that the moving selector is in the designated spatial relationship with any of the selections, as indicated by decision diamond 114, the gaming system temporarily reveals any award masked by the selection having the designated spatial relationship with the moving selector, as indicated by block 116.

In one embodiment, the gaming system temporarily reveals any award masked by the selection having the designated spatial relationship with the selector by displaying the award value for a relatively short designated amount of time, such as for five seconds. In another embodiment, the gaming system temporarily displays such an award by displaying the award until the selector is no longer in the designated spatial relationship with the selection masking that award. In another embodiment, the gaming system temporarily displays the award by displaying that award until the selector is in the designated spatial relationship with a different one of the selections. In one embodiment, the gaming system temporarily reveals masked awards until an end of a round of play.

If the gaming system determines that the selector is not in the designated spatial relationship with any of the selections, or after temporarily revealing the award masked by any selection having the designated spatial relationship with the selector, the gaming system enables the player to indicate another desired position for one of the selectors, as indicated by block 110. In one embodiment, not illustrated in FIG. 3, the gaming system only allows the player to indicate a subsequent desired position upon the selector reaching the previously-indicated desired position. In another embodiment, the gaming system enables the player to indicate another desired selector position at any point during the play of the game.

The gaming system enables the player to continue to participate in the play of the game until the play of the game has ended. Thus, after enabling the player to indicate a desired position for one of the selections, as indicated by block 110, the gaming system begins a loop by determining whether a game expiration event has occurred for the player, as indicated by decision diamond 118. If the game expiration event has not occurred, the gaming system enables the player to provide another input indicative of a desired position of a selector, as indicated by block 110. If the game expiration event has occurred for the player, as indicated by decision diamond 118, the gaming system provides an award to the player based on any selections then having the designated spatial relationship with any of the selectors associated with the player, as indicated by block 120. That is, at the end of the play of the game, the gaming system determines whether any of the player's selectors are in the designated spatial relationship with any of the spaced-apart selections displayed in the field, and, if so, provides an award based on that designated spatial relationship. In one embodiment, the award for the play of the game is based on any values masked by any selections in the designated spatial relationship with any selector. In another embodiment, the award is based on a quantity of selections which are in the designated spatial relationship with a single selector.

It should be appreciated that the illustrated loop of determining whether a game expiration event has occurred occurs substantially continuously and simultaneously with the player providing inputs for the play of the game. That is, as the player provides inputs and as the gaming system displays selectors as moving within the field, the gaming system simultaneously determines whether the game ending condition has occurred, ending the play of the game.

In one embodiment, the gaming system begins the loop to determine whether the game expiration event has occurred (i.e., the loop defined by decision diamond 118) regardless of whether the player has indicated a desired position for one of the selectors, as indicated by block 110. In this embodiment, a player could potentially provide no input during the play of the game, and the game expiration event could thereafter occur (such as based on the expiration of a game timer), ending the play of the game, without any of the selectors moving within the field.

In the embodiment illustrated in FIG. 3, the process 100 is shown with respect to a single player's participation in the game disclosed herein. In a synchronous embodiment of the game disclosed herein, the gaming system enables a plurality of players to participate in a single play of the game simultaneously, wherein the play of the game begins and ends at the same point in time for each of the players. In this embodiment, the process 100 applies individually to each of the players, wherein the beginning of the game and the determination that the game expiration event has occurred happen simultaneously for each of the players.

In an asynchronous embodiment of the disclosed game, the gaming system enables a plurality of players to participate in the game disclosed herein, wherein at least one of the players begins or ends his or her play of the game at a different time than another one of the players. That is, in one embodiment, the game expiration event can occur at a first time for a first player, and at a different second time for a second player. It should be appreciated that in this embodiment, the process 100 applies to each individual player, even if process 100 begins or ends at a different time for that player than for another player.

FIGS. 4A, 4B, 4C, 4D, 4E, 4F, 4G, and 4H are front elevation views of a display device of one embodiment of the gaming system disclosed herein, wherein the gaming system determines when a play of the game has ended based on the expiration of the timer, as described above with respect to FIG. 3. In the embodiments illustrated in FIGS. 4A, 4B, 4C, 4D, 4E, 4F, 4G, and 4H, the gaming system displays a screen 150 on an appropriate display device, such as display device 16 of the gaming device illustrated in FIG. 1A. In the illustrated embodiment, the screen 150 includes a field 160, the field containing a plurality of spaced-apart selectors. In the illustrated embodiment, the spaced-apart selectors are arranged as eight columns of selectors 164*a*, 164*b*, 164*c*, 164*d*, 164*e*, 164*f*, 164*g*, and 165*h*, and eight rows of selectors 162*a*, 162*b*, 162*c*, 162*d*, 162*e*, 162*f*, 162*g*, and 162*h*. Thus, in the illustrated embodiment, the gaming system displays a total of sixty-four spaced-apart selections arranged as a matrix of selections. It should be appreciated that the number of selections and the arrangement of the selections within the field can vary.

FIGS. 4A, 4B, 4C, 4D, 4E, 4F, 4G, and 4H also illustrate two different selectors 170*a* and 170*b*. In the illustrated embodiment, the selector 170*a* is a selector movable based on inputs provided to the disclosed gaming system at the illustrated screen 150. That is, the gaming device including the illustrated screen 150 is usable to control the selector 170*a*. In the illustrated embodiment, selector 170*b* is controlled based on inputs provided elsewhere. In one such embodiment, the selector 170*b* is a selector controlled by another player of the disclosed game, providing inputs at a different gaming device displaying a different screen similar to screen 150. It should be appreciated that in this embodiment, the other player sees the selector 170*a* as a selector associated with a different player, and can control the selector 170*b* by providing inputs as will be discussed below. Further, in this embodiment, if a player at another gaming device of the gaming system is controlling the selector 170*b*, that other player cannot see any award values temporarily revealed to the player viewing the screen 150 of the gaming device illustrated in FIGS. 4A, 4B, 4C, 4D, 4E, 4F, 4G, and 4H. In another embodiment, the selector 170*b* is controlled by the gaming system, such that only the player viewing the screen 150 is participating in the play of the game illustrated in FIGS. 4A, 4B, 4C, 4D, 4E, 4F, 4G, and 4H. In the illustrated embodiment, the gaming system further displays a timer 180 and a game information display area 190.

Figure 4A:
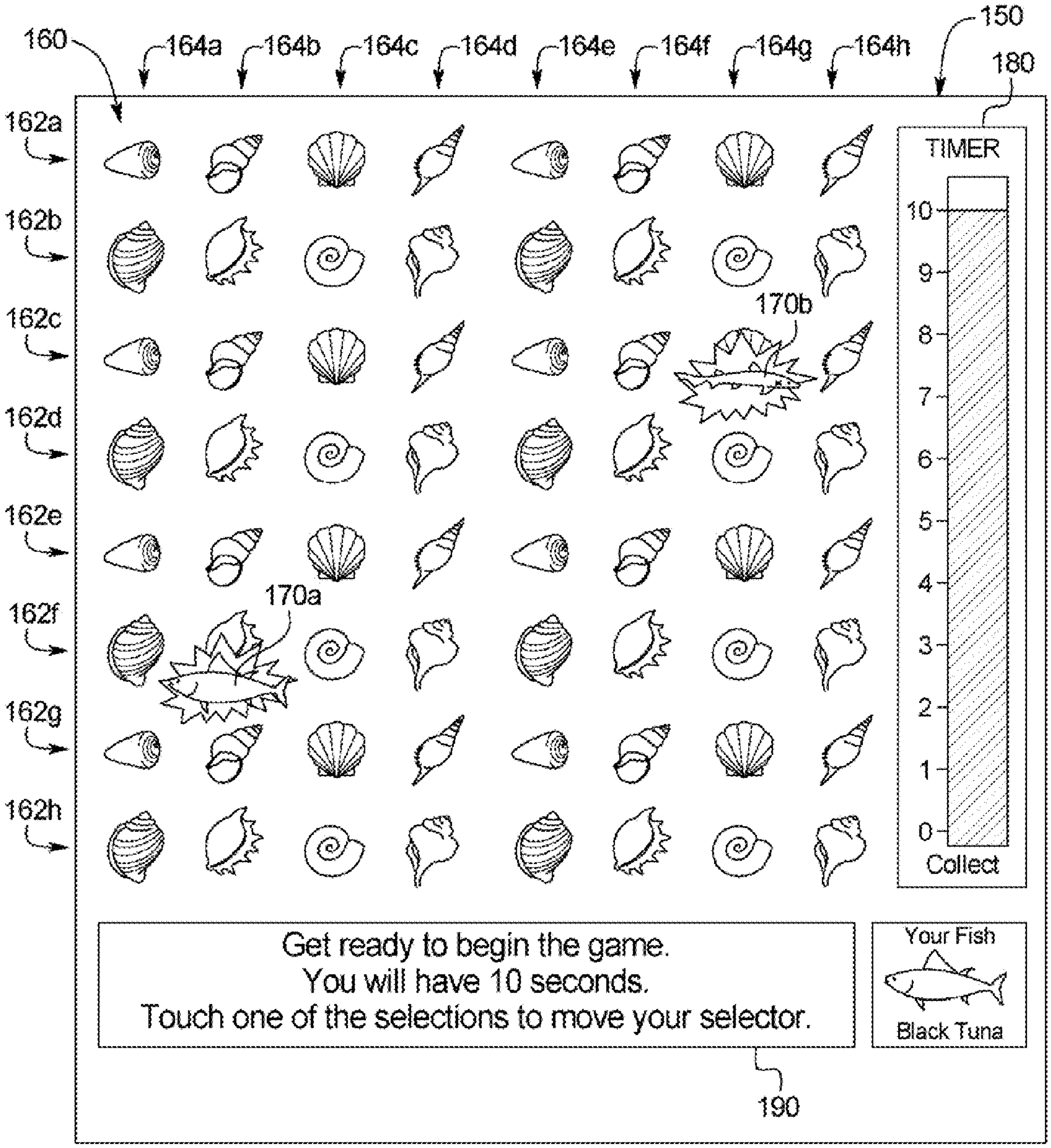
FIGS. 4A, 4B, 4C, 4D, 4E, 4F, 4G, and 4H are front elevation views of one embodiment of a display device of the gaming system disclosed herein, wherein the gaming system determines when a play of the game has ended based on the expiration of the timer.

Referring to FIG. 4A, the timer 180 displays an indication that ten seconds remain in the illustrated play of the game. It should be appreciated that in the illustrated embodiment, a play of the game only lasts for ten seconds; as such, the display 150 illustrated in FIG. 4A is an illustration of the play of the game prior to the play beginning, or just after the play of the game has begun. Referring still to FIG. 4A, the gaming system displays a game information display area 190 for displaying game status information and other information pertinent to the player during a play of the game. In the embodiment illustrated in FIG. 4A, the gaming system indicates that the play of the game is about to begin by displaying an appropriate message in the game information display area 190. The gaming system further indicates that the player will have ten seconds to move the selector 170*a* by touching one of selections. That is, the gaming system indicates to the player that the player can provide an input indicative of a desired selector position by touching an appropriate portion of the field 160. Thus, the game information display area 190 indicates both that the length of the play of the game is determined by an amount of time that passes (i.e., ten seconds), and indicates instructions to the player as to how to move the player's selector 170*a*.

Figure 4B:
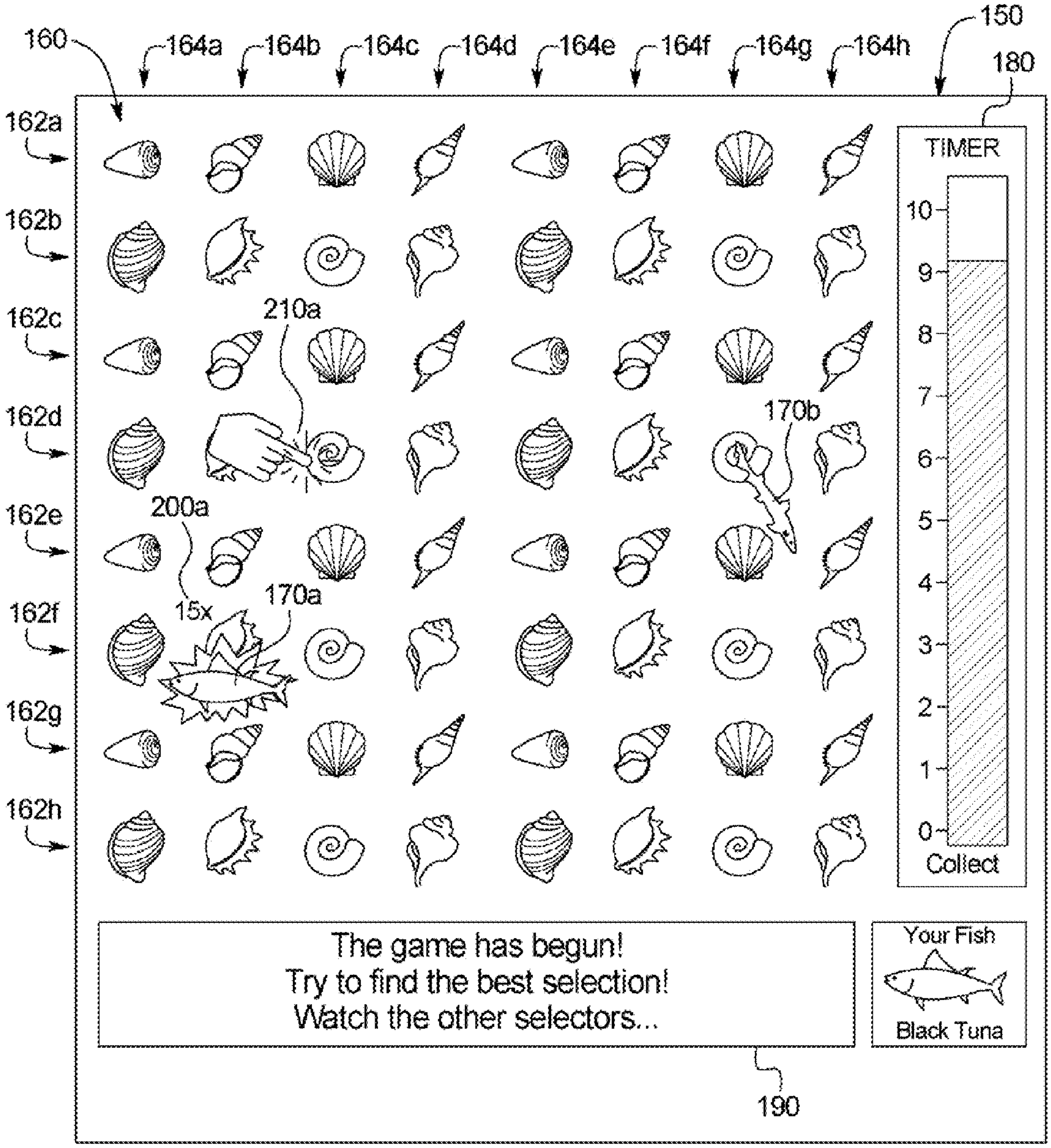

Referring now to FIG. 4B, the gaming system disclosed herein is illustrated after a play of the game has begun. Specifically, as indicated by the timer 180, approximately one second of the ten second play of the game has already passed at the point in time illustrated in FIG. 4B. Thus, approximately nine seconds remain in the play of the game. FIG. 4B also illustrates that at the point in time wherein approximately one second has expired from the play of the game, the selector 170*a* has not yet begun to move. That is, the selector 170*a* began the game near the selection at row 162*f*, column 164*b*, and at the point in time illustrated in FIG. 4B, remains near the selection at row 162*f*, column 164*b*. At the point in time illustrated in FIG. 4B, however, the gaming system displays an award 200*a* associated with the selection at row 162*f*, column 164*b*. Specifically, the gaming system displays an award value of 15×, indicated by numeral 200*a*, to the player viewing the display 150 of the illustrated gaming device, indicating that if the award associated with the selection at row 162*f*, column 164*b* is provided to a player, the award will cause a designated amount, such as a previously displayed award or an amount wagered or bet on a play of the game, to be multiplied by fifteen. It should be appreciated that in the illustrated embodiment, since the play of the game has not yet ended, the gaming system displays the value of 15× to the player only temporarily—that is, the gaming system displays the value of 15× only so long as the selector 170*a* is in the designated spatial relationship with the selection at row 162*f*, column 164*b*. It should further be appreciated that in one embodiment, if another player is providing inputs at a different gaming device to control the movement of the selector 170*b*, the gaming system does not display the value of 15× to the other player. That is, the gaming system merely causes a display of the position of the selector 170*a* to the player at the gaming device associated with the selector 170*b*, and that player makes his or her strategy decisions based on such display.

FIG. 4B also illustrates that for the play of the game, the player has provided input indicative of a desired position for the selector 170*a*. Specifically, in the illustrated embodiment, the hand icon indicates that the player has touched the screen 150 at a point corresponding with the point 210*a* of the field 160. Thus, the gaming system will cause the selector 170*a* to begin moving toward the indicated position 210*a* of the field 160. It should be appreciated that in one embodiment, as the gaming system causes the selector 170*a* to move to the indicated position 210*a*, the gaming system will temporarily display any values to the player viewing the display 150 and providing inputs to control the selector 170*a* if the values are associated with any of the selections between the current position of the selector 170*a* and the indicated position 210*a* with which the selector 170*a* comes into the designated spatial relationship.

As further illustrated in FIG. 4B, selector 170*b* has begun to move for the play of the game. Specifically, selector 170*b* has moved from the selection at row 162*c*, column 164*g*, to the selection at row 162*d*, column 164*g*. It should be appreciated that in the illustrated embodiment, the gaming system displays to the player with whom the selector 170*a* is associated the position of the selector 170*b*, but does not display the award value of any of the selections with which the selector 170*b* is in the designated spatial relationship. Thus, it should be appreciated that in the illustrated embodiment, the player providing inputs to cause selector 170*a* to move about the field 160 can utilize the position of the selector 170*b* in developing a strategy without knowing the values of the selections in the designated spatial relationship with selector 170*b*. It should be appreciated that in the illustrated embodiment, the selector 170*b* has moved from a first selection, as illustrated in FIG. 4A, to a second selection, illustrated in FIG. 4B, wherein the selections are adjacent to one another, in the approximately one second of elapsed time. Thus, in the illustrated embodiment, the constraints on the movement of the selectors causes the selectors to move at a discernibly slow speed, such that moving the selector into the designated spatial relationship with each of the plurality of spaced-apart selections displayed in the field is infeasible for a single play of the game.

As illustrated in FIG. 4B, the game information display area 190 displays a message indicating that the game has begun, and further indicating that the goal for the player is to try to find the selection associated with as high an award as possible. Finally, the game information display area 190 displays a message indicating that the player can watch the other selectors (i.e., selector 170*b*) to provide a hint or a suggestion as to the value masked by various ones of the selections.

Figure 4C:
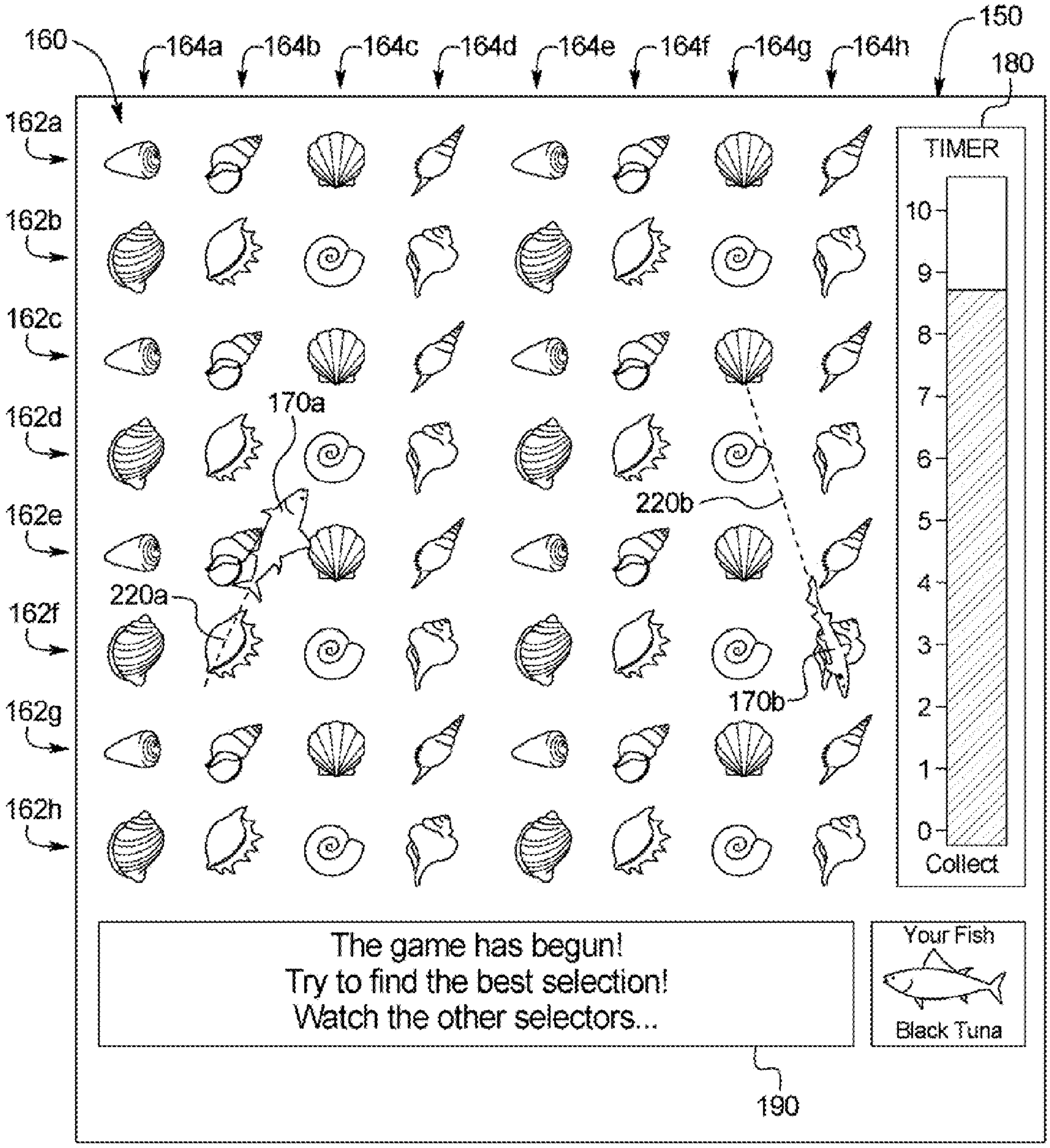

FIG. 4C illustrates the gaming system disclosed herein at a point in time after both selectors 170*a* and 170*b* have begun to move within the field for the play of the game. Specifically, as discussed above, selector 170*a* is moving toward the previously indicated portion of the field of spaced-apart selectors, and selector 170*b* is moving to an unknown position based on an input provided either by another player, or by the gaming system itself. In FIG. 4C, dotted lines 220*a* and 220*b* indicate the path of each of the selectors 170*a* and 170*b*, respectively. In one embodiment, the gaming system displays the dotted lines within the field of the screen 150, such that a player can easily see the past movement of each of the selectors 170*a* and 170*b*. In another embodiment, the gaming system does not display such dotted lines (or other similar indicators) to the players; rather, the players rely on their memory and skill to determine where the selectors 170*a* and 170*b* have been during the play of the game.

As illustrated, the selector 170*a* is not in the designated spatial relationship with any of the selections at the point in time illustrated by FIG. 4C; therefore, the gaming system does not temporarily reveal the award associated with any of the selections. As further indicated, approximately one and one half seconds have elapsed for the play of the game; thus, as indicated by timer 180, approximately eight and one half seconds remain for the play of the game.

Figure 4D:
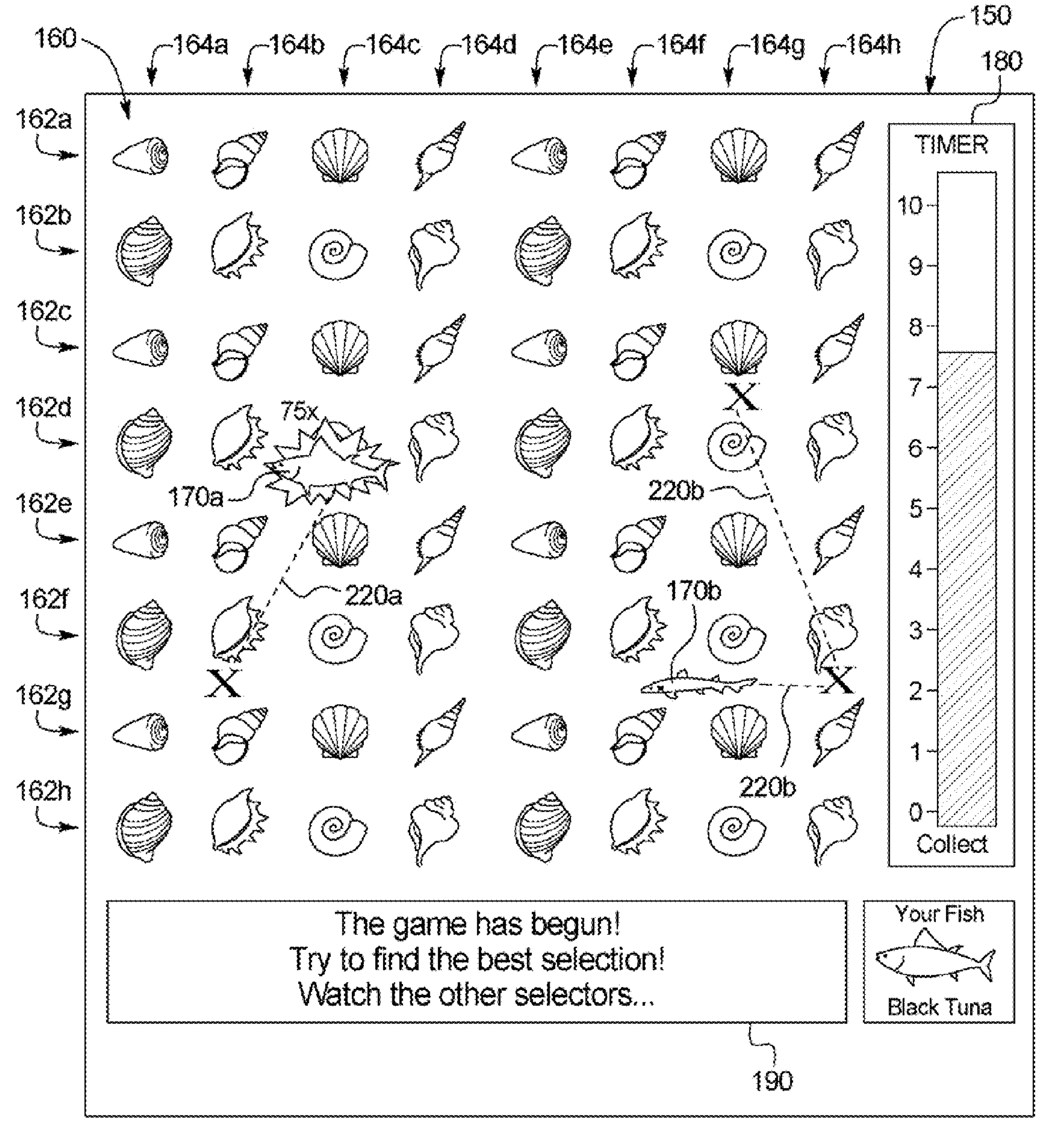

FIG. 4D illustrates the gaming system at a point in time after the selector 170*a* has reached the position of the field 160 indicated by numeral 210*a* of FIG. 4B. As illustrated by timer 180, approximately seven and one half seconds remain in the play of the game illustrated. Moreover, as illustrated, selector 170*a* is at the position of the selection at row 162*d*, column 164*c*. As illustrated, the selector 170*a* is in the designated spatial relationship with this selector; as such, the gaming system temporarily displays the value associated with the selection at row 162*d*, column 164*c*. In the illustrated embodiment, the value associated with the selection at row 162*d*, column 164*c* is 75×. It should be appreciated that at the point in time illustrated in FIG. 4D, the gaming system is no longer displaying an award value of 15×, as in FIG. 4C. That is, because of the temporary nature of the displayed value of 15×, the gaming system ceased displaying the value of 15× upon the selector 170*a* moving away from the selection masking that value.

As discussed above, if one of the selectors is in the designated spatial relationship with the selection at row 162*d*, column 164*c* at the end of the play of the game, the gaming system will multiply a previously provided award by seventy-five. In the illustrated embodiment, since the selector 170*a* has reached the previously-indicated position of the field 160, the gaming system enables the player to select another desired position within the field. In the illustrated embodiment, however, the gaming system has displayed two different values to the player as masked by two different selections—a value of 15× (which was previously temporarily displayed and is no longer displayed at the point in time illustrated by FIG. 4D) and a value of 75×. Thus, for the play of the game, the player may develop a strategy which will cause the selector 170*a* to be in the designated spatial relationship with the selection masking the award of 75× at the end of the play of the game, as the 75× value is relatively large when compared with the 15× value.

As further illustrated by dotted line 220*b*, the selector 170*b* has reached a desired position, either determined by the gaming system or indicated by a player viewing a screen associated with the selector 170*b*, corresponding with the selection at row 162*f*, column 164*h*, and thereafter changed direction and is headed from right-to-left in the field 160. It should be appreciated that both the path illustrated by line 220*b*, as well as the amount of time which the player perceives the selector 170*b* as pausing at the selection at row 162*f*, column 164*h*, may be used to develop a strategy as to the relative values of the selections. Specifically, in the illustrated embodiment, the selector 170*a* spent relatively little time at the selection at row 162*f*, column 164*h*, and as such, the player playing at the illustrated gaming device (who cannot see the value masked by such selections) may decide that such selection does not have a relatively high value, and thus may not provide an input to cause his or her selector to approach such selection.

Figure 4E:
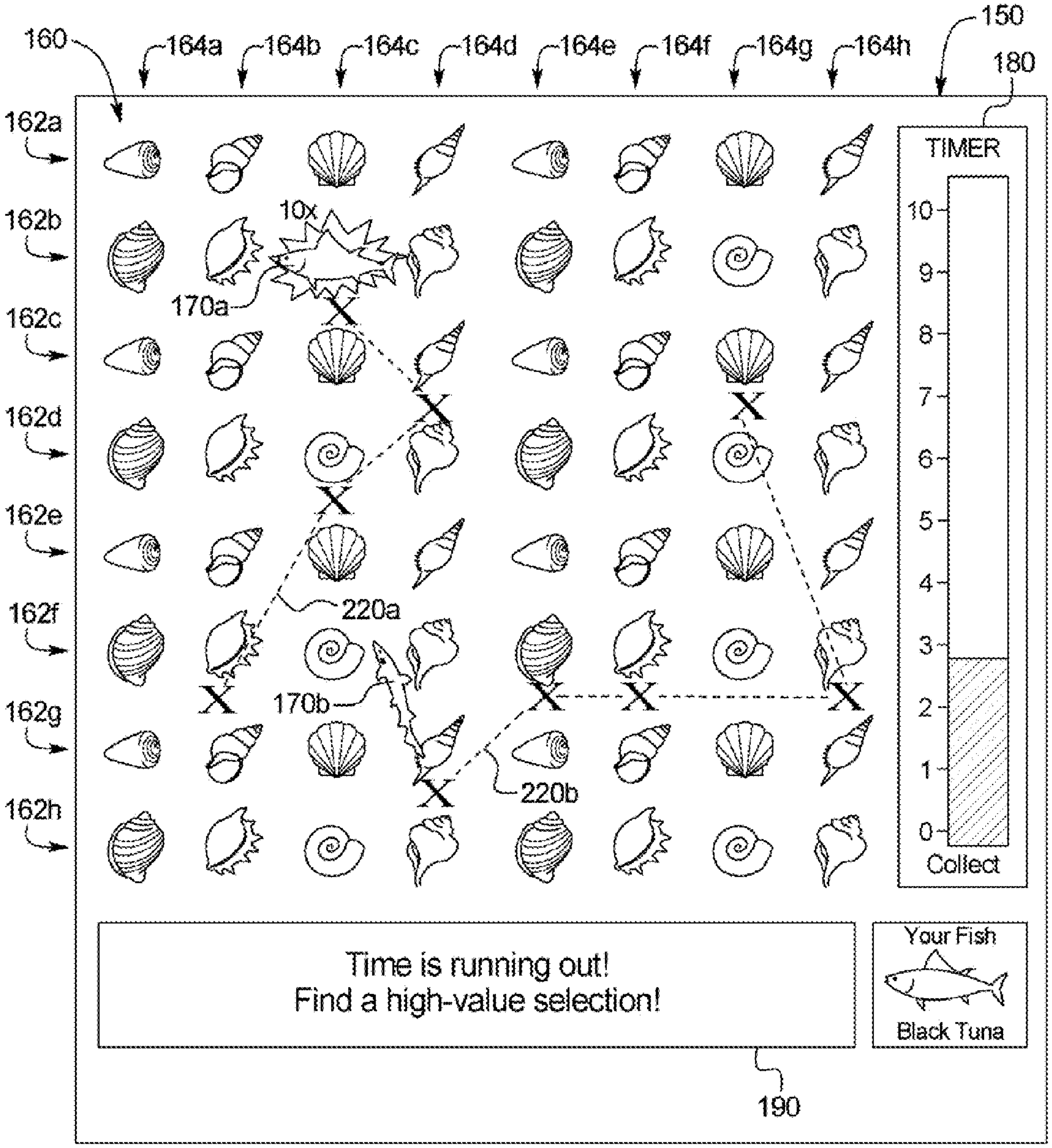

FIG. 4E illustrates that at the point in time wherein approximately two and one half seconds remain in the play of the game, as indicated by timer 180, the selectors 170*a* and 170*b* have traveled to the selections indicated by the dotted lines 220*a* and 220*b*, respectively. Specifically, selector 170*a* is currently in the designated spatial relationship with the selection at row 162*b*, column 164*c*, which selection is associated with an award value of 10×. Selector 170*b* was most recently in the designated spatial relationship with the selection at row 162*g*, column 164*d*, and is headed toward the selection at row 162*d*, column 164*c*. As discussed above, the selection at row 162*d*, column 164*c* is associated with an award having a value of 75×. It should be appreciated that in one embodiment, either another player or the gaming system (which is determining the desired position of the selector 170*b*) may have noted that the selector 170*a* was in the designated spatial relationship with the selection at row 162*d*, column 164*c* for a relatively long period of time, and as such may have deduced that the selection at row 162*d*, column 164*c* is associated with a relatively large value.

Referring still to FIG. 4E, the gaming system displays a message in game information display area 190 indicating that time is running out for the play of the game, and that the player should attempt to cause his or her selector to move into the designated spatial relationship with a selection masking a relatively high value. In the illustrated embodiment, the player may also notice that the selector 170*b* is moving toward the high-valued selection masking an award of 75×, and may therefore provide an appropriate input (i.e., by touching the screen in the desired position) to cause selector 170*a* to move toward the relatively high-value selection at row 162*d*, column 164*c*.

Figure 4F:
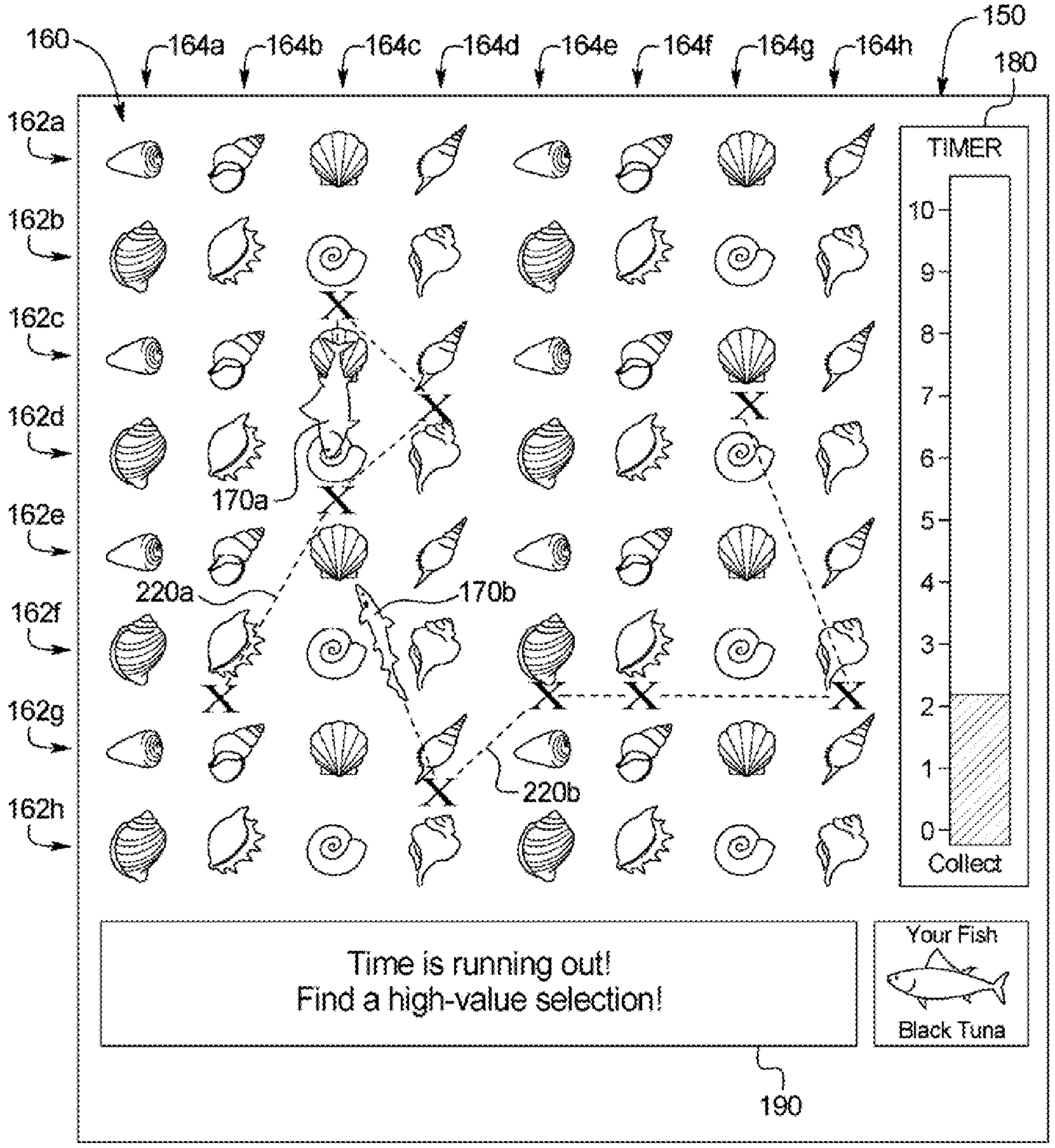

FIG. 4F illustrates a point in time wherein approximately two seconds remain for the play of the game, as indicated by timer 180. In the illustrated embodiment, the gaming system disclosed herein displays the two selectors 170*a* and 170*b* as both moving toward the same selection at row 162*d*, column 164*c*. In the illustrated embodiment, the first of the selectors to reach a selection prior to the end of the game will receive the award associated with the selection—thus, the gaming system in the illustrated embodiment increases player excitement and enjoyment by providing a time-sensitive "race" to reach the selection with the relatively high value of 75× first. It should be appreciated that in one embodiment, a player providing inputs to cause selector 170*b* to move within the field 160 does not know the value masked by the selection at row 162*d*, column 164*c*—rather, the player providing inputs to cause selector 170*a* to move knows the value and knows that the selector 170*b* is moving toward that selection. In one embodiment, as time expires, the gaming system provides appropriate audio-visual cues to the players, such as music which increases in speed, intensity, volume, or pitch, as well as video cues such as flashing or brightening lights, to indicate that the play of the game is coming to an end.

Figure 4G:
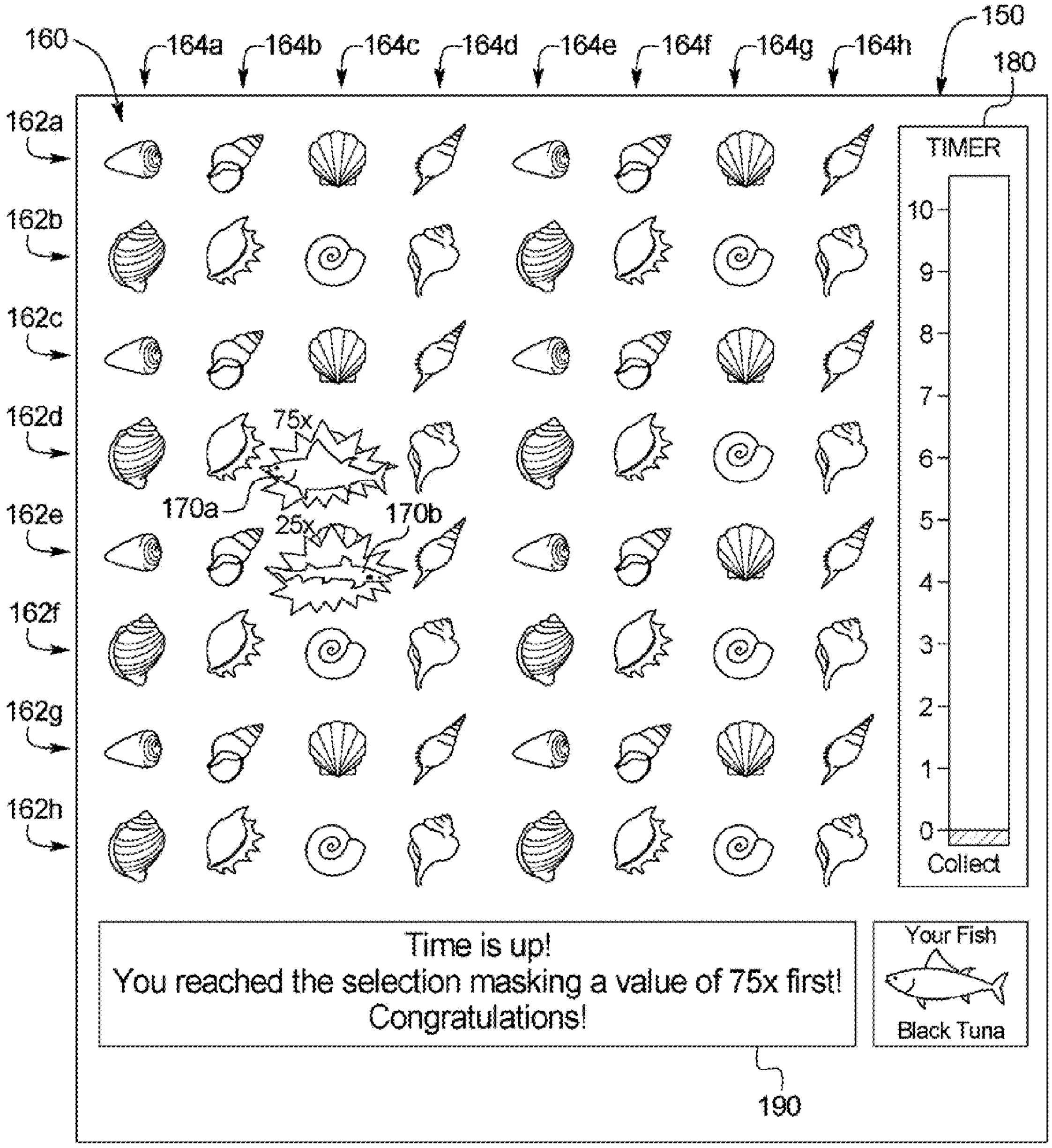

Referring to FIG. 4G, the gaming system displays the field 160 at the end of the play of the game, as indicated by the expiration of timer 180. At the end of the illustrated play of the game, the gaming system determines that the selector 170*a* is in the designated spatial relationship with the selection at row 162*d*, column 164*c*, and determines that the selector 170*b* is in the designated spatial relationship with the selection at row 162*e*, column 164*c*. It should be appreciated that in the illustrated embodiment, despite the fact that both selector 170*a* and 170*b* were moving toward the selector at row 162*d*, column 164*c* prior to the end of the play of the game, the selector 170*a* reached that selection first and thus was provided with the award masked thereby. In the illustrated embodiment, the gaming system determines which of the selections other than the selection at row 162*d*, column 164*c* the selector 170*b* is nearest to and provides an award based on that selection. In the illustrated embodiment, this determined selection is the selection at row 162*e*, column 164*c*. As illustrated, the gaming system displays the award value received by the selector 170*b* upon completion of the play of the game—specifically, the gaming system displays a value of 25×.

Referring still to FIG. 4G, the gaming system displays a message in the game information display area 190 indicating that the play of the game is over. Moreover, the gaming system displays a message indicating that the player of the illustrated gaming device displaying the screen 150 reached the selection masking a value of 75× before the other player, and as such, provides the player with that award.

Figure 4H:
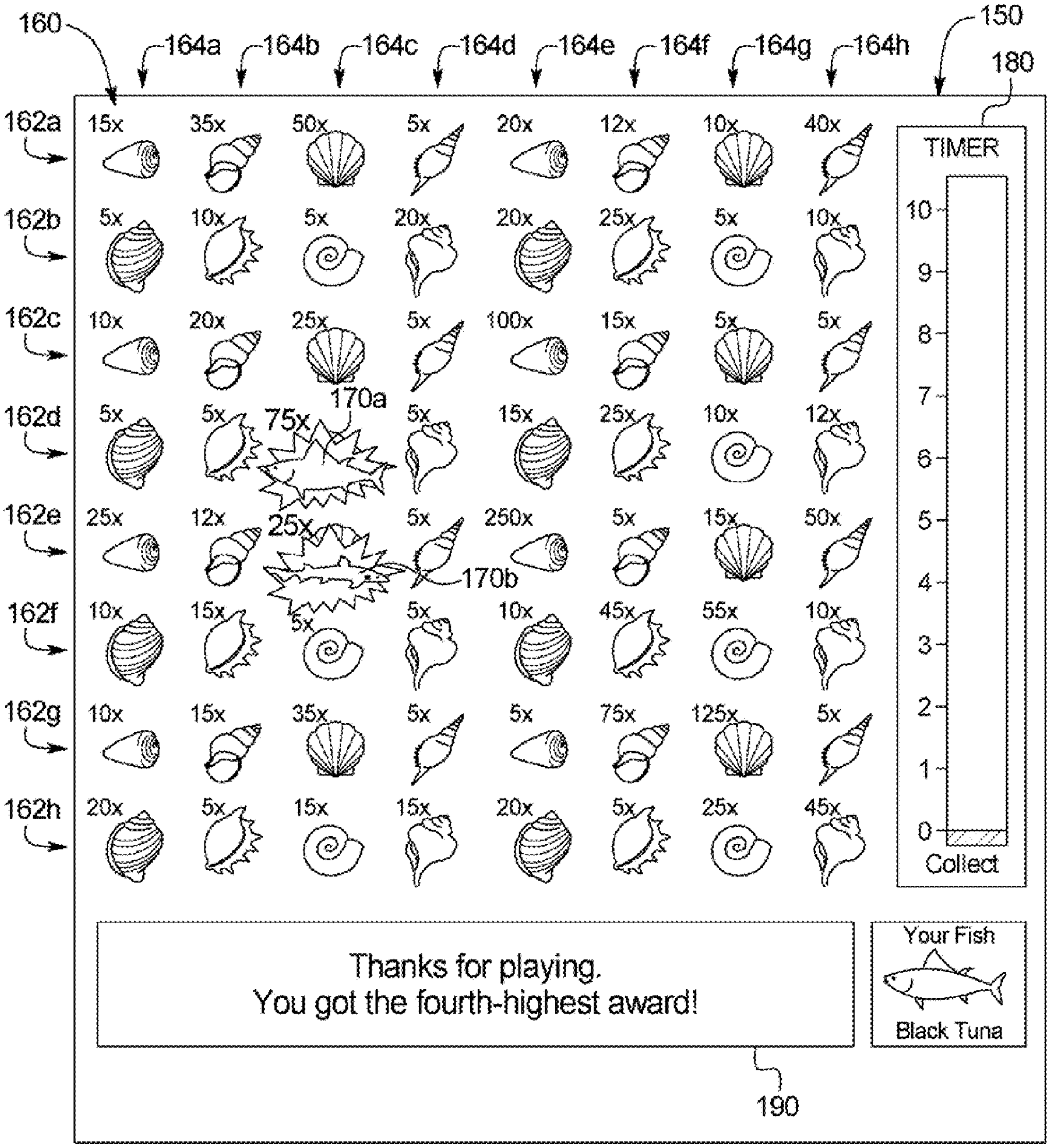

Finally, referring to FIG. 4H, the gaming system disclosed herein displays the awards masked by each of the plurality of selections of the field 160. Specifically, the gaming system displays a plurality of values wherein three values are larger than the award received by the player (i.e., a value of 100× masked by the selection at row 162*c*, column 164*e*, a value of 125× masked by the selection at row 162*g*, column 164*g*, and a value of 250× masked by the selection at row 162*e*, column 164*e*). The game information display area 190 of FIG. 4H displays a message to the player indicating that the player received the fourth highest award. Thus, in the illustrated embodiment, the gaming system increases player excitement and enjoyment by displaying information to the player indicative of awards that could potentially have been won for the play of the game, as well as a message indicating the relative success of the player with respect to the potentially winnable awards.

In the illustrated embodiment, two selectors 170*a* and 170*b* are illustrated to the player at the gaming device associated with selector 170*a*. In another embodiment (not shown), the gaming system disclosed herein is configured to enable a player to participate in a play of the game substantially identically to the play of the game described above, but with less information available to devise a strategy. In an example embodiment, the gaming system displays only a single selector to the player in a single-player game. In this example, the player does not have the additional information relayed by the movement and timing of the selector 170*b* associated with either another player's desired movement or a gaming device-determined movement. In this embodiment, the gaming system nonetheless enables a player to use his or her strategy and skill to ascertain a largest possible award prior to an end of the play of the game, based on information displayed during movement of the player's selector 170*a*, in an effort to maximize the award provided to the player at the end of the play of the game.

In one embodiment, the gaming system disclosed herein enables players to provide a plurality of inputs during a play of a game in an effort to win as large an award as possible. Specifically, based on information revealed to the player both about values of various selections in the field of selections, as well as the position of selectors of other players and/or under the control of the gaming system, the gaming system enables a player to generate a strategy and implement that strategy based on the length of the game. As discussed with respect to FIGS. 4A, 4B, 4C, 4D, 4E, 4F, 4G, and 4H, the player was able to identify a selection masking a relatively high value, and knowing the position of that selection, was able to return to the selection before another player was able to cause a selector associated with that player to be in the designated spatial relationship with the selection. Thus, the gaming system disclosed herein enables players to implement strategies discerned in real-time, based on observed activities in the bonus game, in an effort to maximize an award provided for the play of the game.

In one embodiment, the game expiration event occurs upon an expiration of a game timer, such that a play of the game is defined by the passage of a designated amount of time. In this embodiment, the game timer begins at the start of the play of the game, and upon expiration of the timer, the gaming system determines that the game expiration event has occurred and ends the play of the game. In another embodiment, the gaming system determines whether a game expiration event occurs based on a number redemptions or claims of a selection made by a player, to be discussed in detail below. In this embodiment, the game expiration event occurs for a player when the player has used each of that player's redemptions or claims of a selection. In another embodiment, the gaming system determines whether a game expiration event occurs for the player based on a number of indicated desired positions for the play of the game. For example, if a player indicates ten different desired positions for one or more selectors, the gaming system determines after the tenth indicated desired position that the game expiration event has occurred and that the play of the game has ended. In another embodiment, the gaming system determines that a play of the game has ended based on a total distance traveled by one or more of the selectors. For instance, if the field is a grid of ten units by ten units, the gaming system determines that the play of the game has ended in one embodiment when a selector has traveled a total of twenty-five units for a single play of the game. In other embodiments, whether the game expiration event has occurred is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the player of the gaming system is aware of an ending condition of the game. In the embodiment illustrated in FIGS. 4A, 4B, 4C, 4D, 4E, 4F, 4G, and 4H, the gaming system conveys the ending condition to the player by displaying a timer indicating an amount of time remaining. In another embodiment, the gaming system conveys the ending condition to the player by displaying a countdown timer which counts down to zero from a designated beginning time. In another embodiment, the gaming system provides each of a plurality of players with a designated quantity of moves, such as ten moves, for a play of the game. In this embodiment, the gaming system displays an indication of the number of moves remaining such that the players are aware how many more moves exist for the play of the game. It should be appreciated that other appropriate ending criteria can be used wherein the gaming system displays an indication as to how much longer the disclosed game will last.

In the illustrated embodiment, the gaming system constrains the movement of the displayed selectors by limiting the speed at which the selectors can move within the field of selections. That is, the gaming system does not enable the player to provide inputs sufficient to cause a temporary revelation of each of the plurality of values associated with the plurality of selections for a play of the game. It should be appreciated that in this embodiment, the gaming system requires the player to make a determination, based on the remaining time in the play of the game, as to which selection that the player is aware of is the "best" selection, without enabling the player to make such a determination based on a complete universe of information. Thus, the player must determine, based on a revealed subset of the values masked by the selections, as well as based on the observed motion of any other selectors displayed in the field, which of the selections is a best selection for the play of the game. The gaming system increases player excitement and enjoyment by causing the player to make such a determination as time expires, or as an ending condition otherwise approaches, for a play of the game.

In one embodiment, such as the embodiment illustrated with respect to FIGS. 4A, 4B, 4C, 4D, 4E, 4F, 4G, and 4H, the gaming system does not enable players to split an award associated with a same selection. That is, the gaming system in this embodiment enables only a single player to win an award associated with a single selection. In another embodiment, the gaming system enables multiple players for a play of the game to split an award. For example, gaming system enables multiple players whose selectors are each in the designated spatial relationship with a single selection to split the award value masked by the selection. In one such embodiment, the players split the award equally. In another such embodiment, the award is split among the players, wherein a first player to move his or her selector into the designated spatial relationship with the selection receives a larger portion of the award masked by the selection (such as 75% of the award) and a second player to move his or her selector into the designated spatial relationship with the selection receives a smaller portion of the award masked by the selection (such as 25% of the award). In another embodiment, each player receives a percentage of an award masked by a selection, but the percentage each player receives is decreasing depending on the order in which the players' selectors moved into the designated spatial relationship with the selection. For example, a first player receives 100% of an award value masked by a selection, a second player receives 75% of the award masked by the selection, a third player receives 50% of the award masked by the selection, and a fourth player receives 25% of the award masked by the selection. In this embodiment, a maximum of four players can receive portions of a same award masked by a same selection. In other embodiments, how the gaming system divides a same award won by a plurality of selectors of a plurality of different players is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, such as the embodiment discussed with respect to FIGS. 4A, 4B, 4C, 4D, 4E, 4F, 4G, and 4H, the gaming system disclosed herein provides a synchronous game in which a plurality of players participate simultaneously. That is, the gaming system provides a game in which a plurality of players begin the play of the game and end the play of the game at the same time, based on the same ending criteria. In one such embodiment, the players participating in the game disclosed herein are each at a same bank of gaming devices. In another embodiment, the players participating in the disclosed game are each at gaming devices within a same gaming establishment, such as a same casino. In one embodiment, wherein the gaming system disclosed herein is provided to a plurality of players over a network such as the internet, the players of a play of the game may each be in a designated geographic region, such as within the same country and wagering on plays of the game with a same currency. In other embodiments, which players participate in a play of the game disclosed herein are predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, the gaming system disclosed herein enables players to participate in one or more plays of the game, wherein the game is implemented in an asynchronous mode. That is, the gaming system enables players to enter and exit the game disclosed herein at different times, such that, for example, the following occurs in order: (1) a first player begins playing the game; (2) a second player begins playing the game; (3) the second player ceases playing the game; and (4) the first player ceases playing the game. In an asynchronous embodiment, the game expiration events occur at different times for different players. In one embodiment, the occurrence of the game ending event for a player depends upon when the player began playing the game. In various other embodiments, the occurrence of the game ending event for a player is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria. It should be appreciated that in the asynchronous embodiment, the players enter and exit the game asynchronously, but the game continues for any players then involved in the play of the game.

In an asynchronous embodiment, the gaming system enables a player to elect to receive his or her award even if a time period associated with the game has not expired. For example, if a gaming system provides a player with ten seconds to play the game, and further enables the player to redeem or collect an award prior to the expiration of those ten seconds, the gaming system in one embodiment also enables the player to return to either (a) the primary game or (b) a new play of the game disclosed herein immediately following redemption or collection of the award. Thus, the gaming system does not require the player to wait until the end of any time period associated with the play of the game before engaging in further gaming activity.

In one embodiment, wherein the gaming system disclosed herein provides a game which players can enter and exit asynchronously, the gaming system displays the game as a perpetual or ongoing game. That is, regardless of any player activity in the game (i.e., regardless of whether players are providing inputs to move selectors amongst the field of selections), the gaming system maintains a representation of the plurality of selections which is displayable whenever any player enters the game, such as by wagering on a play of the game. In this embodiment, upon any player entering the game, the gaming system enables that player to begin playing the game without a discernable wait. It should be appreciated that by eliminating a potential wait present in the synchronous embodiment (such as waiting for players at other gaming devices of a bank of gaming devices to wager on a play of the game), the gaming system increases player excitement and enjoyment by enabling players to begin playing almost immediately upon entering the game.

In one embodiment, upon a player beginning a play of an asynchronous game as disclosed herein, the gaming system enables the player to play the game according to process 100 of FIG. 3. That is, in an asynchronous embodiment, when a player enters the perpetual or ongoing game disclosed herein, the gaming system displays a field including a plurality of spaced-apart selections, and also displays at least one selector associated with the player who entered the game. In one embodiment, the gaming system also displays any selector associated with any other players then participating in a play of the game. As discussed above, in one embodiment the gaming system enables the player to see the position of the selectors associated with the other players of the game, but does not enable the player to see any temporarily revealed values masked by any of the selections of the field which are in the designated spatial relationship with any other players.

In one embodiment, as discussed above, the gaming system constrains the movement of one or more selectors based on one or more constraints. In one embodiment, the gaming system constrains this movement by applying a maximum speed with which a selector can move through the field of selections. In another embodiment, the gaming system constrains the movement of a selector by limiting the total amount of distance the selector can move for a play of the game. In another embodiment, the gaming system constrains the movement of the selector by limiting the speed with which the selector turns or otherwise changes direction.

In one embodiment, the gaming system causes a player's selector(s) to move amongst the plurality of selections at a same speed or rate during a play of the game. In another embodiment, the gaming system causes the speed with which one or more selectors moves amongst the plurality of selections to change during a play of the game, such as based on one or more wagers provided or based on one or more selections whose masked value is temporarily revealed. In various embodiments, how the gaming system constrains the movement of one or more selectors is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the players primary game wager, determined based on time (such as the time of day), determined based on an amount of coin-in accumulated in one or more pools or determined based on any other suitable method or criteria.

In one embodiment, one or more selections within the field is associated with a power-up instead of or in addition to a masked award. In this embodiment, if a player provides an appropriate input to cause his or her selector to be in the designated spatial relationship with that selection, the gaming system applies a movement power-up to the future movement of that selector. For example, if a selection is associated with a movement power-up that increases the speed of a selector, a player whose selector moves into the designated spatial relationship with the selection thereafter moves with an increased speed.

In another embodiment, the power-up associated with a selection includes a vision power-up, such that upon obtaining the vision power-up, the amount of information visible to a player during the play of the game is increased. For example, a vision power-up causes the designated spatial relationship to expand, such that a proximity of a selector to a selection is reduced to display the value masked by that selection. In one embodiment, a vision power-up causes each value revealed to a player during a play of the game to be visible for an entire play of the disclosed game. In another embodiment, the vision power-up enables a first player to see information available or visible to a second player. In another embodiment, if a first player obtains a vision power-up, the information visible to at least one other player is increased. For example, if a first player obtains a visual power-up, a second player can see the values revealed as a result of the movement of the first player's selector. In another embodiment, a vision power-up enables at least one player to see the values masked by one or more selectors regardless of whether the player's selector is in the designated spatial relationship with such selections. For example, a visual power-up enables a player to see the four largest values masked by selections in the field and the locations of those four values. Alternatively, a visual power-up enables a player to see a list of the four largest values masked by selections, but without being able to see the locations of those values.

In one embodiment, a power-up associated with a selection is applicable for a designated quantity of time, such as for five seconds. Alternatively, a power-up is applicable for an entire play of the game. In one embodiment, the gaming system stores one or more power-ups such that a player can elect to use such a power-up at a later point in time. In various embodiments, which power-up is provided to a player, the player or players to whom it is provided, and the duration of the applicability of the power-up is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, after a player receives a power-up, the power-up is no longer associated with any selection. That is, the power-up can only be obtained once for a play of the game. In another embodiment, the power-up persists such that each player who visits a selection can obtain the power-up. In one embodiment, a designated quantity of players can obtain the power-up for the play of the game. In one embodiment, the power-up moves selections with which it is associated during the course of a play of the game. In various embodiments, the selection or selections with which a power-up is associated is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, at least one constraint on the movement of the selectors is applied regardless of any inputs by the players. That is, the gaming system simulates a force imparted on various selectors displayed in the field, such that even without the player providing any input indicative of desired movement of a selector, the selectors move within the field. For example, a constraint is implemented as a universal movement constraint such that a universal force is applied to a plurality of objects in the field, and such that the force can impart movement on those objects.

In one embodiment, wherein the disclosed game is a nautical or under-sea themed game, a universal movement constraint is implemented as a simulated tide within a field of shells. For example, the tide could be flowing from left-to-right across the field. In one embodiment, the tide impacts only selectors. In this embodiment, while a selector is stationary (i.e., a player has not provided any input indicative of a desired movement), the selector is slowly pushed from left-to-right across the field. In a further embodiment, if the player provides an input indicative of desired movement, the tide ceases impacting the selector. Alternatively, the tide could continue to impact the selector even after the player provides an input indicative of desired movement of the selector.

In another embodiment, a constraint causes one or more selections to move within the field. For example, in the tide embodiment discussed above, the tide may push one or more selections, displayed as shells on a sea floor, from left-to-right across the field. This constraint on movement of the selectors and/or selections increases player excitement and enjoyment by causing motion even in the absence of player inputs. Thus, if a player forgets to provide an input, or if a gaming device is malfunctioning, the selector and/or selections can still move within the field, potentially resulting in awards for the play of the game.

In one embodiment, at least one displayed feature of the field alters the way the constraint on movement is applied. For example, in the sea floor example discussed above, at least one patch of seaweed may indicate a direction of the tide's movement. Further, at least one feature of the sea floor (such as a crevasse), may reduce or eliminate the impact of the tide, such that if a selector is in the crevasse, the selector is not impacted by the tide.

In one embodiment, the constraint on movement impacts the input provided by the player indicative of desired movement of a selector. For example, if a player provides an input indicative of desired movement with the tide (i.e., from left-to-right in the field) the tide causes the selector to move more quickly from left-to-right. Similarly, if the player indicates desired movement from right-to-left, the tide causes the selector to move more slowly from right-to-left as the selector moves against the tide. If the player indicates a desired movement upward or downward, the tide in different embodiments either impacts the motion of the selector or does not impact the motion of the selector.

In various embodiments, whether an external constraint on movement such as the tide described above applies or impacts the movement of selectors and/or selections is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In various embodiments, the amount and direction of any external constraints on movement (such as the tide described above) is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, for a player's participation in the game disclosed herein, the gaming system provides the player with a plurality of attempts or tries for that player's play of the game. In this embodiment, the gaming system determines whether a game expiration event has occurred for the player based on whether the player has any attempts or tries remaining for the play of the game. For example, the gaming system provides each player who enters the game with ten tries for the play of the game. In one embodiment, for each try, the gaming system enables the player to provide a plurality of inputs to move a selector amongst the field of spaced-apart selections. For each of the inputs, the gaming system displays a selector associated with the player as moving amongst the field of spaced-apart elements, repeatedly determining during such moving whether the selector is in the designated spatial relationship with any of the selections. In one embodiment, if the gaming system determines that the selector is in the designated spatial relationship with any of the selections, the gaming system temporarily reveals the value masked by such selection. In one embodiment, the gaming system further enables the player to elect to claim or redeem the revealed value during a try. That is, at any point during an attempt or try provided to the player, the gaming system enables the player to elect to receive a temporarily revealed award masked by one of the selections. It should be appreciated that in this embodiment, unlike the embodiment discussed above (wherein the player has a designated amount of time before the award masked by one of the selections is provided to the player), the player can provide an input indicating a desire to receive the temporarily revealed award at any point during an attempt or try.

In one embodiment, for each attempt or try granted to a player for a play of the game disclosed herein, the gaming system enables the player to cause a selector to move amongst the spaced-apart selections for a designated period of time, such as for ten seconds. At any point during that period of time, the player can claim or redeem a selection which is in the designated spatial relationship with the selector. In one embodiment, upon the player electing to claim or redeem a value, or upon the expiration of the time period associated with the attempt or try, the gaming system determines whether the game expiration event has occurred, as discussed above with respect to FIG. 3. That is, the gaming system determines whether the player has any additional tries for the play of the game, and if so, enables the player to begin the next attempt or try. This process repeats itself until the player has participated in each of the provided attempts or tries for a play of the game—that is, until the gaming system determines that the game expiration event has occurred. In one embodiment, upon the occurrence of the game expiration event, the gaming system provides the player with an award for the play of the game based on any awards claimed or redeemed during that play of the game.

In one embodiment, the gaming system enables the player to provide an input to claim or redeem an award associated with a selection prior to the end of a period of time of a play of the game. In one embodiment, following such an input, the gaming system requires the player to wait until the end of the period of time to begin a subsequent play of the game (if available). In another embodiment, upon claiming or redeeming the award, the gaming system enables the player to begin a subsequent play of the game (if available) immediately following claiming or redemption.

In one embodiment, if the designated period of time during which the player can cause the selector to move amongst the plurality of selections for an attempt or try expires without the player having voluntarily claimed or redeemed a selection, the gaming system automatically causes the selector to claim or redeem any selection with which it is in the designated spatial relationship at the end of the designated period of time. For example, if the ten second limit expires for an attempt or try and the player has not provided an input to claim a selection, the gaming system in one embodiment automatically claims the selection nearest to the selector at the expiration of the designated period of time. In one embodiment, the gaming system thereafter determines whether the game expiration event has occurred (i.e., whether any attempt or tries remain), and enables the player to provide inputs to move the selector for an additional or subsequent attempt or try.

In one embodiment, the gaming system disclosed herein displays an indication that a player participating in the disclosed game is claiming or redeeming a selection without displaying the value of such claimed or redeemed selection. In this embodiment, the gaming system does not enable the player who previously claimed or redeemed the selection to re-claim or re-redeem that same selection for a subsequent attempt or try. In one embodiment, however, the gaming system provides a designated amount of time after a player has redeemed a particular selection for other players to attempt to cause their selectors to move to the portion of the field occupied by the redeemed selection, and to thereafter redeem the selection themselves. In a further embodiment, the gaming system enables other players to claim only a portion of the value originally claimed. For example, if a first player claims a selection, a second player who thereafter claims the selection only receives 80% of the value claimed by the first player. In various embodiments, the impact of a previous redemption on the amount available for subsequent players to redeem (e.g., an amount of reduction of the value claimed by a first player) is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, the gaming system does not display an indication that a player is redeeming or claiming a selection. In this embodiment, wherein a first player's selector is in the designated spatial relationship with a selection and the first player is redeeming or claiming that selection (either by actively causing the claim or based on the expiration of the designated period of time for the try or attempt), the gaming system simply displays the position of the first player's selector to each of a plurality of other players. In this embodiment, therefore, it should be appreciated that the other players cannot tell for certain that the first player is redeeming a selection. Rather, in this embodiment, the gaming system enables the other players to deduce such redemption based on the amount of time that the first player's selector is in the designated spatial relationship with the redeemed selection. In this embodiment, in addition to the other players not being certain as to the value of the redeemed or claimed selection, the other players are not certain as to whether the selection is even being redeemed.

In one embodiment, the gaming system disclosed herein increases player excitement and enjoyment by displaying certain information during the play of the game according to predefined rules or criteria. That is, the gaming system provides players with additional data to consider when making decisions regarding desired positions for one or more selectors during the play of the game. In one embodiment, the gaming system enables a player to elect to provide inputs indicative of desired positions for the selector(s) which are relatively far from other players' selectors, such that when the player causes a relatively large award to be revealed (i.e., based on the selector satisfying the designated spatial relationship with a selection masking the relatively large award), the player can explore the area around the award before claiming or redeeming that relatively large award without worrying that other players will quickly move in and claim the relatively large award.

On the other hand, the gaming system disclosed herein may cause a player to elect to explore selections in an area of the field which is relatively well-populated with other selectors, such that when the player notices another selector perform an early or relatively quick claim or redemption (i.e., indicating that the player providing input for that selector has found a relatively large award), the player can provide an appropriate input to quickly move in and re-claim the selection previously claimed by the other player. However, it should be appreciated that the more crowded a portion of the field becomes, the more difficult it may be for a selector to explore an area around a selection masking a relatively large award without risk that other selectors will claim the explored (but temporarily vacated and as-yet un-claimed or un-redeemed) relatively large award.

In the embodiment wherein other players are not certain whether a first player's selector is redeeming a selection for the play of the game, the gaming system further increases player excitement and enjoyment because the other players must perceive the amount of time spent in the designated spatial relationship with the potentially redeemed selection, and also must have a sense of whether the first player caused an early claim or redemption to occur, which potentially indicates that a relatively large value was temporarily revealed. That is, the other players must determine whether a player performed a claim or redemption early in his or her attempt or try, such as three seconds into a ten second attempt or try, which may indicate that a large award was redeemed. Thus, in an embodiment wherein the claiming of a selection by a player is not clearly displayed to the other players, an additional element of perception is required of the other players to ensure that they make an accurate deduction as to the values masked by the selections.

It should be appreciated that in the asynchronous embodiment, the gaming system disclosed herein provides the player with additional strategic considerations with respect to causing his or her selector to move amongst the selections of the field, such as considerations arising from noticing another player quickly claiming a selection.

In one embodiment, after a selection has been claimed or accumulated (and after any time period for other players to additionally claim or accumulate the selection has expired), the gaming system re-generates a selection in place of the previously claimed selection. In one embodiment, this regenerated selection masks a value which is randomly determined, such that the newly masked value can potentially differ from the previously masked value. A previously claimed selection must therefore be re-visited by a player's selector to ascertain the new value masked by the selection. In various embodiments, the new value of the regenerated selection is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system also regenerates one or more selections which have not been claimed for a relatively long period of time. For example, the gaming system regenerates any selection which has not been redeemed or claimed for ten minutes. In another example, the gaming system regenerates any selection whose value has been temporarily displayed a designated number of times without the selection being claimed. For example, the gaming system regenerates any selections whose masked value has been temporarily revealed five times without being claimed. In various embodiments, whether and when certain selections are regenerated is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In various embodiments, causing one or more selections to regenerate during the ongoing bonus game increases player excitement and enjoyment because the gaming system requires players to re-visit the selections to determine the currently masked award. Thus, in one example, if a player provides an input to cause his or her selector to move into the designated spatial relationship with a selection masking a relatively small award, the gaming system enables the player to provide an input at a later time to cause his or her selector to again move into the designated spatial relationship with the same selection, and potentially provides the player with an opportunity to win a larger award than was previously available.

In one embodiment, as discussed above, the gaming system enables a plurality of players at different gaming machines to simultaneously participate in a play of the game disclosed herein. In these embodiments, the gaming system enables the players to each develop a strategy for providing inputs to cause one or more selectors associated with each player to move amongst the field of selections, such as based on perceived movement of other players' selectors and also based on any values temporarily revealed to the player during a play of the game. In a further embodiment, the gaming system provides additional information to a player to enable that player to develop a strategy for moving a selector amongst the field of selections. For example, the gaming system displays certain information to certain players based on one or more predefined rules or criteria. In one such embodiment, the gaming system enables a subset of the plurality of players to share additional information with one another. For example, the gaming system disclosed herein enables a subset of the plurality of players to participate in the disclosed game as a team, and to share information with members of that team. In this embodiment, the gaming system enables team members to share information about temporarily revealed values revealed based on the movement of the selector of any team member with the rest of the team. It should be appreciated that in this embodiment the gaming system enables a plurality of players to spread out across the field of selections and to more thoroughly explore the values masked by those selections.

In another embodiment, the predefined rules or criteria enable a first player to elect to share information about values revealed based on the movement of the first player's selector to a second player. In this embodiment, for example, if two friends are each participating in the game disclosed herein, the gaming system enables one of the friends to initiate a sharing of the values revealed based on movement of that friend's selector. It should be appreciated that in this embodiment, the person whose information is to be shared initiates the sharing.

In one embodiment, if a first player elects to share information with a second player, the predefined rules or criteria enable the second player to see the shared information after an occurrence of a designated information sharing event. For example, the designated information sharing event could include a passage of an amount of time after the information is visible to the first (i.e., sharing) player, the first player moving to a different location, the first player collecting an award, or the first player taking another suitable action.

In various embodiments, the gaming system disclosed herein enables a first player to share certain additional information with a second player during a play of the game according to the predefined rules or criteria. In one such embodiment, the gaming system enables the first player to send a message to the second player during the play of the game. In another embodiment, the gaming system enables the first player to give the second player access to see the values temporarily revealed by the position of the first player's selector. In another embodiment, the gaming system enables the first player and the second player to share information based on their membership of a common team. In a further embodiment, the amount of information shared between the first player and the second player, wherein the first player and the second player are on a same team, is based on an overall team score with respect to other teams. Thus, for a play of the game, relative success by a team with respect to other teams can result in the sharing of additional information between members of that successful team. In various embodiments, whether the first player and the second player can share information, and what information the first player and the second player can share, are predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, the gaming system enables each player of the game to see the value revealed by each of the plurality of other players regardless of whether the players know each other or are otherwise affiliated with each other. In this embodiment, for the play of the game, as values are temporarily displayed to any player, the gaming system temporarily displays the values to each of the plurality of participations in the play of the game.

In still another embodiment, the gaming system disclosed herein implements the predefined rules or criteria to cause each value revealed based on a selection being in the designated spatial relationship with a selector to remain displayed throughout the remainder of the game. For example, if a player provides a plurality of inputs to cause a selector to be in the designated spatial relationship with six different selections for a play of the game, the gaming system continues to display the value masked by each of those six selections upon the initial revelation of that value for the remainder of the play of the game. Thus, in one embodiment, at the end of the play of the game, the gaming system is displaying six different values to a player. In a further embodiment, the gaming system displays each masked value to each player for the remainder of the play of the game, such that at the end of the play of the game, each player can see each masked value revealed as a result of any other player's inputs causing a selector to be in the designated spatial relationship with any selection for the play of the game. In one embodiment, the gaming system displays each masked award which is revealed to a player based on the movement of that player's selector(s) for the entire play of the game, but only temporarily displays the masked values revealed based on the movement of other players' selectors. In various other embodiments, when and for how long the values masked by the selections are displayed to various players is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the game disclosed herein is provided as a bonus round following a play of a primary or base game. In this embodiment, upon an occurrence of an appropriate triggering event in the primary or base game, the gaming system enables a player to participate in the bonus game as disclosed herein. In one such embodiment, the gaming system enables players to participate in the synchronous version of the game disclosed herein when the appropriate triggering event has occurred for a plurality of players. In this embodiment, it should be appreciated that each player begins and ends the bonus game at the same time—thus, it should be appreciated that the first player for whom the appropriate triggering event occurs may wait until the appropriate triggering event occurs for each of the other participants in the bonus game. In another such embodiment, wherein the gaming system enables the players to participate in the asynchronous version of the game disclosed herein, the gaming system enables a player for whom the appropriate triggering event occurs to begin providing inputs to move a selector immediately or substantially immediately upon that player entering the bonus round. In various embodiments, whether the appropriate triggering event occurs, such that a player can participate in the bonus round, is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system disclosed herein provides the disclosed game as a single round bonus game. In this embodiment, when the play of the game has ended as described above (e.g., upon the occurrence of a game expiration event such as the expiration of a designated period of time or at the completion of a designated number of claims or redemptions), the gaming system enables the player to participate in additional plays of the primary game. In another embodiment, the disclosed game is a multiple round bonus game. In this embodiment, upon an occurrence of an appropriate triggering event, the gaming system enables the player to participate in a plurality of rounds of the game disclosed herein, and thus enables the player to potentially win multiple awards for a single occurrence of the appropriate triggering event. In various embodiments, the number of rounds of the bonus game disclosed herein which are available to a player upon an occurrence of the appropriate triggering event is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, the gaming system provides the game disclosed herein as a base or primary game. In this embodiment, a player wagers on an opportunity to provide a plurality of inputs for the play of the game, and receives an award for the play of the game as described above. In one embodiment, the range of credits awardable for the play of the game is based, in part, on a wager amount provided for the play of the game. For example, in one embodiment the gaming system enables the player to provide a wager of one-hundred credits to participate in the disclosed game as a primary or base game. In this embodiment, for the play of the game, the gaming system enables the player to win awards ranging from five credits to fifty-thousand credits. In another embodiment, for the play of the game, the gaming system associates at least one of the selections with an award of zero, such that if a selector is in the designated spatial relationship with that selection, the player does not win any award for the play of the game. It should be appreciated that in various different implementations, the magnitudes of awards winnable in plays of the game with respect to the wager amount provided are predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, wherein the gaming system disclosed herein provides the disclosed game in an asynchronous mode, the gaming system provides the game as an ongoing or perpetual bonus game or world. In this embodiment, players can enter and exit the perpetual bonus game or world (such as upon an occurrence of an appropriate bonus triggering event and a game expiration event, respectively), and while in the perpetual bonus game or world can interact with the selectors and selections as they then exist. Thus, in this embodiment, if a first player participates in the disclosed game and exits the perpetual bonus game or world, and a second player thereafter enters the perpetual bonus game or world, the second player will see the perpetual bonus game or world based, in part, on any modifications made to the perpetual bonus game or world made during the first player's participation in it.

In one embodiment, the gaming system enables the player to participate in the bonus game disclosed herein as a tournament game. In this embodiment, the gaming system enables the player to continue to play the bonus game, for a plurality of rounds, so long as the outcome achieved by the player at the end of each round is sufficiently favorable or high with respect to a plurality of other players participating in the bonus game. For example, if the bonus game includes a plurality of rounds, and after each round the top 50% of players progress into the subsequent round, the gaming system tracks a player's award obtained for each round. At the end of the round, if the player is in the top 50% of award values obtained for the play of the game, the gaming system enables the player to participate in a subsequent round. In one embodiment, the gaming system repeats such rounds until a designated quantity of players, such as a single player, remains. In one embodiment, the gaming system provides a tournament award to the designated quantity of players.

In one embodiment, upon entering a play of the game disclosed herein, the gaming system enables a player to begin providing inputs at the same time as all the other players participating in the game, as discussed above. As further discussed above, in one embodiment the gaming system enables a player to begin play of the game asynchronously—that is, the gaming system enables the player to begin providing inputs to play the game immediately or substantially immediately upon entering the play of the game, without regard for whether other players are already playing the disclosed game. In another embodiment, wherein the gaming system provides each player a designated amount of time to complete a try or claim cycle, the gaming system requires a player to wait for the expiration of this try or claim cycle (or heartbeat) prior to providing a first input for a play of the game. In this embodiment, for a play of the game, the cycle of moving and claiming a selection for each of the plurality of players is aligned, regardless of whether the number of cycles remaining for the players is the same. For example, if a first player has already provided inputs for three different cycles or heartbeats for a play of the game, that player has seven try or claim cycles remaining. In this example, a second player just joining the play of the game has ten try or claim cycles remaining. In one embodiment, the gaming system nonetheless causes the first player's fourth cycle and the second player's first cycle to begin and end at the same points in time. Thus, it should be appreciated that the cycles or heartbeats of each of a plurality of players may be aligned, despite the fact that players join and exit the bonus game at different times. In this embodiment, therefore, upon entering the bonus game, the gaming system causes a player to wait for the end of the entered-on cycle or heartbeat prior to providing an input for the play of the game.

In another embodiment, the gaming system maintains a heartbeat independent of the designated amount of time provided to the players for moving and/or claiming a selection for the play of the game. For example, in one embodiment, the gaming system maintains a twenty second heartbeat, and provides players a maximum of ten seconds for moving and claiming a selection. In this embodiment, the gaming system enables the player to claim a selection prior to the expiration of the ten second limit for doing so; however, the heartbeat maintained by the gaming system is not altered based on the amount of time that expires prior to the player claiming one of the selections. Thus, if a player claims a selection in six seconds, in one embodiment the player has to wait an additional fourteen seconds (i.e., until the end of the heartbeat) to begin another of any remaining tries or claims. In various embodiment, the heartbeat time period is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In an asynchronous embodiment, the disclosed gaming system enables one or more players to begin a play of the game regardless of an amount of time remaining in another player's heartbeat or cycle. In this embodiment, the gaming system does not require players' heartbeats to align with each other. In a semi-asynchronous embodiment, players' heartbeats align with one another. In this embodiment, a player may join a play of the game at a time corresponding with a beginning of another player's heartbeat, but not at a time during the middle of the other player's heartbeat or cycle. In one such embodiment, the gaming system also requires a player to remain in the play of the game until his or her heartbeat expires. It should thus be appreciated that in a semi-asynchronous embodiment, the gaming system enables players to enter and exit the game at the beginning and end of heartbeats or cycles, respectively, and further requires the heartbeats of each player to align.

In one embodiment, the gaming system disclosed herein provides an award to a player based on a designated spatial relationship between a selector and a selection. In one embodiment, the designated spatial relationship exists if a selector and a selection are displayed as being less than a designated distance from one another. In another embodiment, the designated spatial relationship exists if a selector and a selection overlap one another. In a further embodiment, the designated spatial relationship exists if a sufficient portion of a selector overlaps a selection. In another embodiment, the designated spatial relationship exists if one selector is closer to a selection than any other selectors displayed in the field. In another embodiment, the designated spatial relationship exists if a selector encircles or encompasses a selection.

In one embodiment, the size of a selector and/or a selection changes during a play of a game. In one such embodiment, if a size of a selector or a selection changes, the determination whether such selector/selection is in a designated spatial relationship also changes. For example, if a selector increases in size, the number of selections which can simultaneously have the designated spatial relationship with that selector also increases. Thus, for purposes of either (a) displaying information about selections having a designated spatial relationship with a selector or (b) redeeming or collecting selections, a size change of a selector can increase or decrease the quantity of selections simultaneously having the designated spatial relationship with that selector. Likewise, the distance the selector must move to attain the designated spatial relationship with a selection decreases. Thus, in one embodiment, increasing the size of a selector or a selection can be an advantage to the player of the disclosed gaming system. Likewise, decreasing the size of a selector or a selection can be a disadvantage to the player of the disclosed gaming system.

In one embodiment, the gaming system alters the size of a selector or a selection based on a player revealing a power-up associated with a selection. In another embodiment, the gaming system alters the size of a selector or a selection based on a quantity of selections which have had the designated spatial relationship with a selector for a play of the game. In various embodiments, whether the size of a selector or selection is altered is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system does not cause each selector to be positionable on top of or in a same area as a selection. In this embodiment, each selector is movable to one or more of a plurality of junctions within the field of selections. Each junction is adjacent to one or more selections. In this embodiment, if a selector is positioned at a particular junction, the gaming system displays the value masked by each selection adjacent to that junction. Moreover, if the player redeems an award, the gaming system provides the award based on each selection adjacent to the junction at which the selector is positioned at the time of redemption. It should be appreciated that in this embodiment, multiple players at different junctions could be adjacent to (and consequently redeem) a same award. In one such embodiment, each player adjacent to that award receives that award in its entirety. In another embodiment, a first player whose selector was the first to be adjacent to the award receives 100% of the award, and a second player whose selector was second to be adjacent to the award receives an amount less than 100% of the award (such as 80% of the award). In another embodiment, if two players redeem an award to which each is adjacent, the players split the award evenly. It should be appreciated that any arrangement of splitting or providing the award to one or more players whose selector is in the designated spatial relationship with the selection is contemplated by the instant disclosure.

In one embodiment, the gaming system only provides the award if the selector and the selection are in the designated spatial relationship and if the selector is stationary—that is, the gaming system provides the award only if the input provided by the player was provided in enough time to cause the selector to reach the desired position and stop prior to the end of the play of the game. In one embodiment, if the gaming system determines that the selector has not reached the inputted desired position prior to the end of the play of the game, the gaming system does not provide the player with any award for the play of the game. In one such embodiment, the gaming system provides no award for the play of the game when the game is provided as a primary game playable upon providing an appropriate wager. In another embodiment, if the selector is in motion at the end of the play of the game, the gaming system provides an award having a designated value, such as a consolation value guaranteed to be provided to the player. In another embodiment, the gaming system provides an award based on the value masked by the nearest selection to the selector at the end of the play of the game. In one such embodiment, the gaming system provides the actual value masked by the nearest selection at the end of the play of the game. In another such embodiment, the gaming system provides an award based on a portion of the value masked by the nearest selection at the end of the play of the game. In one embodiment, the gaming system provides an award based on the most recently revealed value—that is, based on the value masked by the most selection which was most recently in the designated spatial relationship with the selector. In one embodiment, the gaming system provides only a portion of the value masked by the selection most recently in the designated spatial relationship with the selector. In various embodiments, if the selector is still in motion at the end of the play of the game, the value provided to the player is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system disclosed herein enables a player to participate in the disclosed game for a duration determined by the passage of an amount of time, as described above. In another embodiment, the gaming system enables the player to participate in the disclosed game until a number of cycles has occurred, each cycle ending upon the first occurrence of (a) the expiration of a designated amount of time, and (b) the player claiming or redeeming one of the plurality of selections. In another embodiment, the gaming system enables a player to participate in the game disclosed herein until a designated quantity of heartbeats have occurred for the play of the game. In another embodiment, the gaming system enables the player to participate in the game disclosed herein until a designated quantity of selections have been redeemed or claimed for a play of the game. In various other embodiments, the duration of the game disclosed herein is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system disclosed herein enables players participating in a play of the game to see only the position of the selectors associated with other players of the game, as described above. In another embodiment, the gaming system enables a player to see information indicative of a quantity of selectors which are currently in the designated spatial relationship with a given selection. In another embodiment, the gaming system enables the player to see information indicative of a quantity of players which have claimed or redeemed a given selection for a play of the game. In another embodiment, the gaming system does not indicate the quantity of selectors which have claimed or redeemed a given selection—rather, the player must watch as selectors approach the selection and thereafter claim the selection. In one embodiment, the gaming system provides at least two different types of selections, wherein a first type of selection displays an indication of a quantity of selectors which have claimed or redeemed that selection, and wherein a second type of selection does not display a quantity of selectors which have claimed or redeemed that selection.

In one embodiment, the gaming system disclosed herein displays a plurality of selections which are each associated with either a bonus award amount or an amount of zero. In one embodiment, for a play of the game, a player provides a plurality of inputs indicative of a desired selection, wherein the inputs cause the gaming system to associate the player's selector with the desired selection. In one embodiment, as selectors are associated with selections, the bonus award value associated with each selection increase based on the quantity of selectors associated with that selection. In one embodiment, during the play of the game, the gaming system enables a player to provide a hide input. Upon the provision of such a hide input, the player's selector is associated with the selection hidden behind. As more players hide behind the bonus selection, the bonus award associated with the selection increases. In one embodiment, when a designated percentage of the players of the bonus event have elected to hide behind one of the selections, the play of the game ends. In this embodiment, each player who elected to hide for a play of the game receives an award based on the selection that player hid behind. In this embodiment, any player who did not elect to hide does not receive any award. Thus, in one embodiment, players must weigh the potential to win a relatively small award resulting from hiding behind a selection with few other selectors against the possibility of electing to move and having the designated percentage of players become hidden while the selector is in motion, resulting in no award at all.

In one embodiment, the gaming system disclosed herein enables a single player to participate in the disclosed game.

In one such embodiment, the gaming system provides a time limit for the single player, such that the player can explore the field of selections during the time limit and cause his or her selector to be in the designated spatial relationship with a desired selection at the expiration of the time limit. It should be appreciated that in this embodiment, the gaming system enables the player to develop a strategy to explore as many selections as possible while still being able to return to a desired selection prior to the end of the play of the game. In another embodiment, the gaming system enables a single player to participate in the play of the game as described above with respect to the multiple-player embodiments, but wherein the other selectors displayed to the player are controlled by the gaming system. In this embodiment, the gaming system enables the player to develop strategies similar to those developed during the multiple-player embodiments discussed herein.

In one embodiment, the values masked by the selections are independent for each of the plurality of selections. In another embodiment, such as the embodiment illustrated in FIG. 5, the values masked by the selections are determined based, in part, on values masked by other selections in proximate to or adjacent to each selection.

Figure 5:
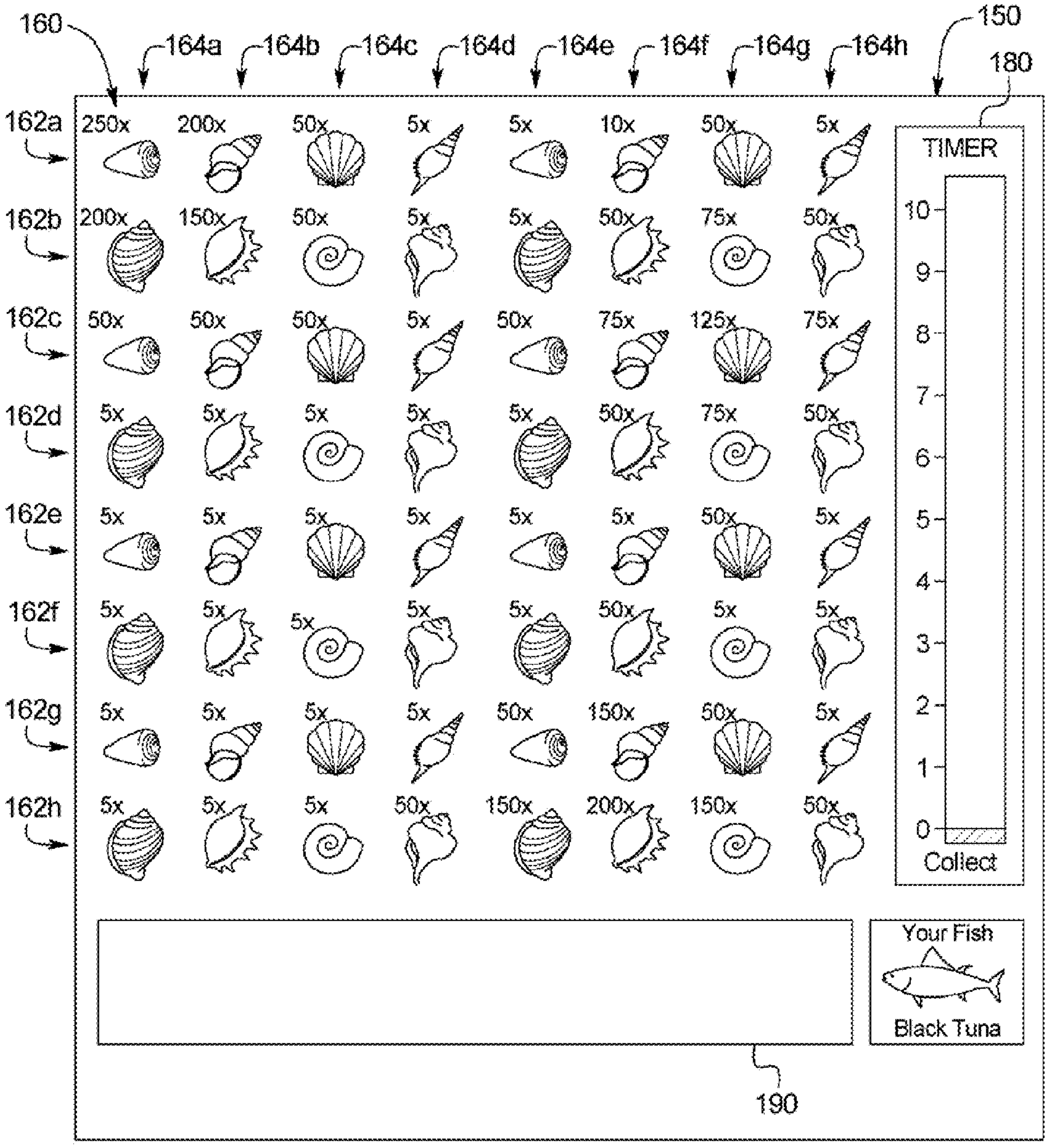
FIG. 5 is a front elevation view of one embodiment of a display device of the gaming system disclosed herein illustrating the awards associated with a plurality of selections in the field.

Referring now to FIG. 5, certain of the selections mask values which are related to the values masked by adjacent or nearby selections in the field. For example, a first selection at row 162*a*, column 162*a* masks a value of 250× for the play of the game. The adjacent selections, including those selections at row 162*a*, column 164*b*; row 162*b*, column 162*a*; and row 162*b*, column 162*b*; also mask relatively large values (i.e., values of 200×, 200×, and 150×, respectively). In the illustrated embodiment, selections that are relatively far from the selection at row 162*a*, column 164*a* mask relatively low values. For example, the selection at row 162*h*, column 164*a* masks a value of 5× based, in part, on the distance of this selection from the selection at row 162*a*, column 164*a*. It should be appreciated that selections adjacent to the selection at row 162*c*, column 164*g* (i.e., masking a value of 125×) and adjacent to the selection at row 162*h*, column 162*f* (i.e., masking a value of 200×) also have relatively high values compared to those selections positioned a great distance away. It should therefore be appreciated that the values in the embodiment illustrated in FIG. 5 are interdependent or contoured, such that if a player sees an indication that a value masked by a selection is relatively large, there is a relatively high probability that a selection adjacent to that masked value is also masking a relatively large value. Thus, the disclosed gaming system increases player excitement and enjoyment by enabling a player to reveal multiple high-valued awards if the player finds a selection masking a single high-valued award. In another example, the value of two adjacent selections are each selected from a range of values applicable to those two adjacent selections. In one embodiment, the values masked by the selections are thus interdependent values, or values dependent upon the values masked by other, nearby selections.

In one embodiment, the gaming system disclosed herein displays at least one indicia, separate from the selections themselves, to indicate a relative value of selections proximate to that indicia. For example, the gaming system displays a sea urchin on or near one of the selections of the field, the sea urchin indicating an area of the field having selections with relatively low values. Further, the gaming system displays at least one different indicia, such as a star fish, on or near one of the selections of the field, the different indicia indicating an area of the field having selections with relatively high values. In one embodiment, the gaming system additionally or alternatively uses other audio or visual cues to indicate areas of relatively high-valued or relatively low-valued awards. For example, change of graphical qualities, such as size, color, animation, or shape of selections, or sounds played depending on a position of a selector, can indicate the relative value of awards in a portion of the field. In various embodiments indicia such as those discussed herein are applied to selections, selectors, foreground elements, background elements (such as the field itself), or other items or portions of items displayed by the gaming system.

In one embodiment, the gaming system displays one or more indicia based on one or more power-up obtained by a player during the play of the game. That is, if a player provides inputs that cause his or her selector to move into the designated spatial relationship with a selection associated with an appropriate power-up, one or more indicia may be displayed to that player. Alternatively, whether the indicia are provided to the player or players may be predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the values masked by the plurality of selections are award values (such as amounts of credits) winnable for plays of the game. In another embodiment, one or more of the selections masks a value of zero—that is, if such selections are claimed or redeemed for the play of the game, the gaming system provides no award to the player. In one such embodiment, selections masking a value of zero are provided when the disclosed game is a primary or base game playable upon a wager. In one embodiment, the selections mask values which are multipliers of other awards won, such as awards won in a play of a primary or base game. In one embodiment, at least one selection masks a value indicative of a plurality of free spins or a multiplier of a previously-provided quantity of free spins. In one embodiment, at least one of the selections masks a progressive award. In one embodiment, at least one of the selections masks an award indicative of an additional entry into the bonus round disclosed herein. In various embodiments, the types of values or awards masked by the selections are predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system disclosed herein provides a game whose object is to obtain a plurality of collectable items for the play of the game. In this embodiment, at least one of the plurality of selections can mask one of the collectable items. In one such embodiment, the gaming system requires a player to collect a plurality of collectable items for a play of the game to win an award associated with the collectable items. In this embodiment, causing a selector to be in the designated spatial relationship with the selection, regardless of whether the award masked by the selection is claimed or redeemed, results in an accumulation of any collectable item masked by the award. In one embodiment, if a selection masks a collectable item, only the first selector to be in the designated spatial relationship with that selection accumulates the collectable item. In another embodiment, each selection which is in the designated spatial relationship with the selection during the play of the game accumulates the collectable item. In one embodiment, any collectable items masked by a selection are masked by that selection for a single play of the disclosed game. In another embodiment, a collectable item masked by a selection persists through at least two plays of the disclosed game.

In one embodiment, the gaming system alters an award provided to the player based on a quantity of collectable items accumulated for a play of the game. For example, for each collectable item accumulated during a play of the game, the gaming system multiplies any award provided for the play of the game by five. In another embodiment, the gaming system enables a player to win a collectable item award, such as a progressive award, only upon the player accumulating a designated quantity of collectable items. For example, if the player collects three collectable items for a play of the game, the gaming system provide a collectable item award to the player.

In one embodiment, the gaming system provides a plurality of types of collectable items. In this embodiment, the gaming system only enables the player to accumulate collectable items of one type at a given time. For example, if a player accumulates a first type of collectable item, the player cannot thereafter accumulate a second type of collectable item without first depositing or otherwise disposing of the accumulated collectable item(s) of the first type.

In one embodiment, the gaming system enables a player to discretionarily redeem one or more collectable items during a play of the game. In one embodiment, the gaming system enables the player to redeem one or more collectable items for one or more modifications to the functionality of the disclosed game, as discussed below. In another embodiment, the gaming system enables a player to redeem one or more collectable items during the play of the game for an additional award in the play of the game.

It should be appreciated that collectable items can add an additional element to the strategy developed by a player of the game disclosed herein. That is, in one embodiment, the ability to accumulate collectable elements during a play of the game can be weighed against the ability to receive additional awards for the play of the game. In an example embodiment, obtaining three collectable items for a play of the game results in a progressive award being provided to a player. In this embodiment, for a first selection having a designated spatial relationship with a selector, the player accumulates one collectable element and sees an award of 25×. In a second selection having a designated spatial relationship with the selector, the player accumulates a second collectable element and sees an award of 500×. In this embodiment, the gaming system therefore provides the player with a choice—should the player redeem or claim the award of 500×, and forego the possibility of accumulating the third collectable item and obtaining the progressive award, or should the player continue providing inputs to move the selector in the hopes of accumulating a third collectable item, and at the expense of giving up the award of 500×. Thus, it should be appreciated that the perceived relative value of collectable items to the masked awards provides an additional element of player strategy, thus increasing player excitement and enjoyment.

In one embodiment, the gaming system enables players to obtain modifications to the functionality or appearance of the game disclosed herein. For example, in one embodiment, the gaming system enables a player to obtain the ability to temporarily reveal values masked by selections without stopping adjacent to the selection. In another embodiment, the spatial relationship required to temporarily reveal the value masked by a selection is altered such that the selector need not be as close to the selection to cause a temporary evaluation. In one embodiment, the gaming system enables the player to obtain the ability for his or her selectors to move more quickly through the field of selections. In one embodiment, the gaming system enables the player to obtain the ability for the temporary revelation to last longer, such as for the entire play of the bonus game. In this embodiment, the player does not have to rely as heavily on his or her memory when determining a strategy for a play of the game. In one embodiment, the gaming system enhances the appearance of the selectors for a play of the game. In one embodiment, the gaming system enables the player to obtain the ability to receive a multiple of any value revealed during the play of the game, such as to receive double any revealed value masked by a selection. In one embodiment, the gaming system enables a player to receive extra time in which to position a selector in the designated spatial relationship with a selection. In another embodiment, the gaming system provides the player with one or more extra claims or redemptions for the play of the game. In various embodiments, whether the player receives the disclosed modifications to the functionality or appearance of the game as disclosed herein is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In various embodiments, as discussed above, the gaming system disclosed herein enables a player to elect to claim or redeem a selection prior to the end of a try or claim cycle, during which the player can move a selector. In one such embodiment, the gaming system provides a bonus, such as an early claimer or redeemer bonus, if the player claims or redeems the selection prior to the end of the cycle. In one such embodiment, the value associated with the selection begins at an initial value and decreases over time. In this embodiment, the earlier in the life cycle of the selection that a player claims or redeems that selection, the higher the value masked by the selection. In various embodiments, any modification to the value masked by an award for based on the time at which a selector claims or redeems the selection is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system disclosed herein only enables a designated quantity of selectors to claim or redeem a single selection. In this embodiment, when the designated quantity of selectors have claimed or redeemed the selection, the gaming system displays an audio-visual indication that the selection has expired, and thereafter removes and regenerates the selection. In one embodiment, upon a first player claiming or redeeming a given selection, the gaming system provides the first player with an award based on a portion of the award masked by the selection, such portion not being winnable by any other player for the play of the game. In this embodiment, the remaining portion of the award is the only portion of the award which is thereafter winnable by another player during the play of the game. In various embodiments, the quantity of selectors which can redeem or claim a given award for a play of the game, and the portion of that award winnable by each selector, is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, at least one selection is associated with a plurality of stacked or ordered masked awards. For example, a selection is associated with three different masked awards, wherein the three awards include a first award, a second award, and a third award. In this embodiment, the gaming system initially associates the first award with the selection, such that if a selector is in the designated spatial relationship with the selection, information about the first award will be displayed to any appropriate players. In one embodiment, if a player provides an input to redeem or collect the first award, the gaming system provides the first award to the player, removes the first award from the stack of awards and associates the second award with the selection. Thereafter, if a selector subsequently moves into the designated spatial relationship with the selection, the gaming system displays information about the second award, the first award having already been won and removed from association with the selection. It should be appreciated that if a player redeems or collects the second award, the gaming system repeats the above process for the third award.

In one embodiment, stacked awards are provided in lieu of re-generating an award after a player has redeemed a first award associated with a selection. In one embodiment, the plurality of stacked awards have interrelated values. For example, a plurality of stacked awards may each have values which are relatively high, such that repeated redemption of a given selection repeatedly results in high awards. In another embodiment, a value of a first stacked award has a large difference from a value of a second stacked award, such that a first player who redeems a selection has a substantially different gaming experience than a second player who redeems that selection. For example, a first award may be relatively low and a second award may be relatively high, such that a first player who redeems a selection associated with the stacked award receives a relatively low award, and a second player who redeems that selection receives a relatively high award.

In one embodiment, the gaming system disclosed herein is configured to display an indication of the relative value of an award masked by a selection which is in the designated spatial relationship with a selector. In one such embodiment, the gaming system displays a color indicative of whether the selection masks a relatively good value with respect to the rest of the selections, or a relatively bad award with respect to the rest of the selections. In one embodiment, the gaming system indicates whether the selection masks the highest-value award of any of the selections of the field of selections. In another embodiment, the gaming system displays an indication of a range of values masked by the selections of the field. In another embodiment, other appropriate audio-visual displays or indications are utilized to indicate the relative value of one or more of the selections of the field disclosed herein.

In one embodiment, the gaming system disclosed herein provides a game having an appropriate theme. For example, the gaming system disclosed herein provides a game having an aquatic theme, wherein each selector is a fish, a shark, an octopus, or another appropriate aquatic item which can be displayed as collecting or gathering selections, each selection is a shell, a sea cave, treasure chest, or another appropriate aquatic item which can be collected by a selector, and the goal of the game is to collect awards masked by aquatic items during the play of the game. In one embodiment, a collectable item is a key, gold doubloon, or other appropriate collectable item, for the play of the game. In various other embodiments, other suitable themes can be used as appropriate.

The disclosed gaming system advantageously provides an exciting and enjoyable gaming experience regardless of a quantity of players participating in a play of the game. That is, if a single player is participating in a play of the game, the gaming system enables that player to develop a strategy and to provide a plurality of inputs in accordance with that strategy to maximize an award won for the play of the game. By obtaining as much information as possible during the play of the game, the player can attempt to locate the largest possible award, even if no other players are participating in plays of the game. Moreover, if a plurality of players are participating, the gaming system increases player excitement and enjoyment by enabling each player to develop his or her strategy based, at least in part, on information displayed to that player about the other players' participation.

In one embodiment, the gaming system disclosed herein provides a player with an advantage of waiting to enter the bonus game. Specifically, if a player has to wait for a few seconds to begin a play of the game disclosed herein, the gaming system in one embodiment displays the field and the movement of any other players' selectors within the field. Thus, the gaming system enables the player to obtain more information while waiting to begin playing the game, and therefore enables the player to develop a more informed strategy. In various embodiments, the gaming system disclosed herein advantageously enables a player to elect to defer beginning a play of the game. For example, the gaming system enables a player to elect to wait one or more try cycles, in an effort obtain information about the awards masked by the selections in the field. Alternatively, the gaming system enables the player to elect to wait to begin a play of the game until another player has finished playing, to enable the deferred player to gain information from the other player's actions. The gaming system may enable a player to elect to bank or store a play of the disclosed game, such that the player can wait until a future gaming session (i.e., when the player has more time) or until another player also has the right to pay the disclosed game (i.e., if two friends would like to play the game co-operatively or together). In various embodiments, this ability to schedule an appointment to play the disclosed game advantageously enables a player to pick an opportune time to play, whether based on that player's strategy (i.e., the player can play when many other players are also playing) or based on the player's timing preferences (i.e., the player can play during a future gaming session).

In one embodiment, the gaming system disclosed herein provides one or more virtual or simulated players, such that to other, human players of the game, the virtual players appear to be human players. In this embodiment, the gaming system automatically causes the virtual players' selectors to navigate the field, exploring selections, and eventually to redeem or collect an award. In one embodiment, the virtual players' selectors move in a way that is useful to other players. For example, if a virtual player's selector visits a selection with a relatively high value, the selector remains close to that selector for the remainder of the play of the game. Alternatively, the virtual players' selectors' movement may be random, such that the information presented to the human players is not useful or helpful. It should be appreciated that in the embodiments wherein one or more selectors is controlled by a virtual player, the advantages described above with respect to the multiple player embodiments of the disclosed game can apply even in a single-player environment.

In addition, the gaming system disclosed herein advantageously enables a player to join an ongoing play of the game without having to wait for the ongoing play to come to an end. In the asynchronous and semi-asynchronous embodiments discussed above, a player can join a play of the game with a minimum amount of waiting (i.e., until the end of a try cycle or other gaming cycle) or without any waiting at all (i.e., wherein the player's heartbeats do not directly align with the heartbeats of other players). Moreover, the disclosed gaming system advantageously obviates the need to rely on mystery or invisible bonus triggering, wherein the bonus event is triggered for no apparent reason. Since in the disclosed gaming system a player can begin playing a bonus game immediately upon triggering the bonus game, the gaming system does not need to rely on a mystery or invisible triggering mechanism.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

at least one display device supported by the housing;

a plurality of input devices supported by the housing, the plurality of input devices including an acceptor;

at least one processor; and at least one memory device which stores a plurality of instructions, which when executed by the at least one processor, cause the at least one processor to operate with the at least one display device and the plurality of input devices to:

(a) if a physical item associated with a monetary value is received via the acceptor, establish a credit balance based at least in part on the monetary value associated with the received and identified physical item;

(b) display a plurality of spaced-apart selections in a predefined field to a player, each spaced-apart selection associated with one of a plurality of masked values;

(c) display at least two selectors in the predefined field, a first selector associated with said player;

(d) for a play of a game:

(i) until a game expiration event occurs for said play of the game, the occurrence of the game expiration event being independent of a position of the first selector within the predefined field:

(A) enable said player to provide one or more inputs each indicative of a desired movement of the first selector, (B) for each received input indicative of the desired movement, display the first selector as moving according to the received input indicative of the desired movement, (C) if the first selector has a designated spatial relationship with any one of the selections during any displayed moving, temporarily reveal the masked value associated with said spatially related selection according to a predefined rule without providing any award associated with the temporarily revealed masked value, wherein the masked value associated with at least one of the selections can be temporarily revealed more than once before the game expiration event occurs for said play of the game, and (D) display an indication of a position of a second selector within the predefined field to the player without displaying any indication of any masked value of any selection in the designated spatial relationship with the second selector, and (ii) when the game expiration event occurs:

(A) determine if the first selector has the designated spatial relationship with any of the selections, and (B) if the first selector has the designated spatial relationship with any one of the selections, cause an award to be provided to the player, said award based on the value associated with that spatially related selection, the credit balance being increasable by the award; and (e) if an actuation of a cashout button is received, initiate a payout associated with the credit balance.

2. The gaming system of claim 1, wherein the game expiration event occurs after an expiration of a designated period of time following a start of the play of the game.

3. The gaming system of claim 1, wherein the game expiration event occurs based after a designated quantity of inputs are received from the player during the play of the game.

4. The gaming system of claim 1, wherein each input indicative of the desired movement includes an input indicative of a desired position of the first selector in the predefined field.

5. The gaming system of claim 1, wherein each input indicative of the desired movement is an input indicative of a desired direction of movement of the first selector within the predefined field.

6. The gaming system of claim 1, wherein the designated spatial relationship exists for any selector that is within a designated distance of any selection.

7. The gaming system of claim 6, wherein the designated spatial relationship exists for any selector if that selector is displayed as overlapping a designated portion of any one of the selections.

8. The gaming system of claim 1, wherein the instructions, when executed by the at least one processor, cause the at least one processor to operate with the at least one display device to cause the first selector associated with the player to move according to a first speed of movement during a first portion of the play of the game and according to a second speed of movement during a second portion of the play of the game.

9. The gaming system of claim 8, wherein the first speed of movement is based on at least one selected from the group consisting of: a wager on the play of the game, an award won during a play of a primary game preceding the play of the game, and information about the player stored in a player tracking system.

10. The gaming system of claim 8, wherein the second speed of movement is based on at least one selected from the group consisting of: a wager on the play of the game, an award won during a play of a primary game preceding the play of the game, and information about the player stored in a player tracking system.

11. The gaming system of claim 1, wherein the instructions, when executed by the at least one processor, cause the at least one processor to operate with the at least one display device to temporarily reveal the masked value associated with said spatially related selection by displaying the masked value to the player while the first selector is in the designated spatial relationship with the selection.

12. The gaming system of claim 1, wherein the instructions, when executed by the at least one processor, cause the at least one processor to operate with the at least one display device to temporarily reveal the masked value associated with said spatially related selection by displaying the masked value to the player for a designated period of time.

13. The gaming system of claim 1, wherein the second selector is associated with an opponent.

14. The gaming system of claim 13, wherein the predefined rule includes temporarily revealing the masked value associated with the spatially related selection to the player and not the opponent.

15. The gaming system of claim 1, wherein the plurality of instructions, when executed by the at least one processor, cause the at least one processor to operate with at least one of the plurality of input devices to receive each input indicative of the desired movement over a network.

16. The gaming system of claim 15, wherein the network is an internet.

17. A gaming system comprising:

a housing;

at least one display device supported by the housing;

a plurality of input devices supported by the housing, the plurality of input devices including an acceptor;

at least one processor; and at least one memory device which stores a plurality of instructions, which when executed by the at least one processor, cause the at least one processor to operate with the at least one display device and the plurality of input devices to:

(a) if a physical item associated with a monetary value is received via the acceptor, establish a credit balance based at least in part on the monetary value associated with the received and identified physical item;

(b) display a plurality of spaced-apart selections in a predefined field to a player, each spaced-apart selection associated with one of a plurality of masked values;

(c) display a selector associated with the player in the predefined field;

(d) for a play of a game:

(i) until a game expiration event occurs for said play of the game, the occurrence of the game expiration event being independent of a position of the first selector within the predefined field:

(A) enable said player to provide one or more inputs each indicative of a desired movement of the selector, (B) for each received input indicative of the desired movement, display the selector as moving according to the received input indicative of the desired movement, (C) if the selector has a designated spatial relationship with any one of the selections during the displayed moving, temporarily reveal the masked value associated with said spatially related selection according to a predefined rule without providing any award associated with the temporarily revealed masked value, wherein the masked value associated with at least one of the selections can be temporarily revealed more than once before the game expiration event occurs for said play of the game, and (D) display an indication of when said game expiration event will occur, and (ii) when the game expiration event occurs:

(A) determine if the selector has the designated spatial relationship with any of the selections, and (B) if the selector has the designated spatial relationship with any one of the selections, cause an award to be provided to the player, said award based on the value associated with that spatially related selection, the credit balance being increasable by said award; and (e) if an actuation of a cashout button is received, initiate a payout associated with the credit balance.

18. The gaming system of claim 17, wherein the indication of when the game expiration event will occur includes at least one selected from the group consisting of: an indication of an amount of time, an indication of a quantity of inputs indicative of the desired movement of the selector, and an indication of a quantity indicative of an amount of displayed moving of the selector.

19. The gaming system of claim 17, wherein the award is a first award and at least one of the plurality of selections is associated with at least one collectible, and wherein the plurality of instructions, when executed by the at least one processor, cause the at least one processor to provide a second award to the player based on whether the selection having the designated spatial relationship with the selector is associated with the at least one collectible.

20. The gaming system of claim 17, wherein the plurality of instructions, when executed by the at least one processor, cause the at least one processor to operate with at least one of the plurality of input devices to receive each input indicative of the desired movement of the selector over a network.

21. The gaming system of claim 20, wherein the network is an internet.

* * * * *